United States Patent
Inaki et al.

(10) Patent No.: US 11,427,470 B2
(45) Date of Patent: Aug. 30, 2022

(54) ALUMINUM NITRIDE POWDER CONTAINING NO COARSE PARTICLES

(71) Applicant: TOKUYAMA CORPORATION, Shunan (JP)

(72) Inventors: Yoshitaka Inaki, Shunan (JP); Yasushi Imoto, Shunan (JP); Yasuyuki Yamamoto, Shunan (JP); Masataka Himeno, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 599 days.

(21) Appl. No.: 16/491,904

(22) PCT Filed: Mar. 6, 2018

(86) PCT No.: PCT/JP2018/008575
§ 371 (c)(1),
(2) Date: Sep. 6, 2019

(87) PCT Pub. No.: WO2018/164123
PCT Pub. Date: Sep. 13, 2018

(65) Prior Publication Data
US 2019/0389725 A1    Dec. 26, 2019

(30) Foreign Application Priority Data
Mar. 7, 2017 (JP) .............................. JP2017-042555

(51) Int. Cl.
*C01B 21/072* (2006.01)
*C08K 9/06* (2006.01)
*C08L 83/04* (2006.01)

(52) U.S. Cl.
CPC ............ *C01B 21/0728* (2013.01); *C08K 9/06* (2013.01); *C08L 83/04* (2013.01); *C01P 2004/60* (2013.01); *C01P 2006/12* (2013.01)

(58) Field of Classification Search
None
See application file for complete search history.

(56) References Cited

U.S. PATENT DOCUMENTS

| | | | | |
|---|---|---|---|---|
| 5,110,575 A | * | 5/1992 | Wakimura | ............ C01B 21/072 501/98.4 |
| 5,646,078 A | * | 7/1997 | Mohri | .................. C01B 21/072 501/98.4 |

(Continued)

FOREIGN PATENT DOCUMENTS

| | | |
|---|---|---|
| JP | 2002-53736 A | 2/2002 |
| JP | 2011-125801 A | 6/2011 |

(Continued)

OTHER PUBLICATIONS

International Search Report (PCT/ISA/210) issued in PCT/JP2018/008575, dated Jun. 12, 2018.

(Continued)

*Primary Examiner* — John J Figueroa
(74) *Attorney, Agent, or Firm* — Birch, Stewart, Kolasch & Birch, LLP

(57) ABSTRACT

An aluminum nitride powder containing a very small amount of coarse particles. An aluminum nitride powder which provides a resin composition having high affinity for resins and high moisture resistance.
The aluminum nitride powder has a volume average particle diameter D50 of 0.5 to 7.0 μm in particle size distribution measured with a laser diffraction scattering particle size distribution meter, a D90/D50 ratio of 1.3 to 3.5 and a BET specific surface area of 0.4 to 6.0 m²/g and classified by removing coarse particles whose particle diameter is more than 5 times as large as D90. When resin paste obtained from this aluminum nitride powder and a resin is measured with a grind gauge, the upper limit particle diameter at which a streak is produced is not more than 5 times as large as D90.

(Continued)

Since the classified aluminum nitride powder is surface modified, the aluminum nitride powder which has high filling property in a resin and is excellent in the moisture resistance and insulating property of a resin composition is obtained.

12 Claims, 5 Drawing Sheets

(56) References Cited

U.S. PATENT DOCUMENTS

| | | | |
|---|---|---|---|
| 9,399,577 B2* | 7/2016 | Tamagaki | C01B 21/0728 |
| 2007/0184966 A1* | 8/2007 | Gotoh | C04B 35/581 |
| | | | 148/238 |
| 2015/0086467 A1 | 3/2015 | Fukunaga et al. | |

FOREIGN PATENT DOCUMENTS

| | | |
|---|---|---|
| JP | 2012-140260 A | 7/2012 |
| JP | 2015-86120 A | 5/2015 |
| JP | 2016-74920 A | 5/2016 |
| JP | 6038886 B2 | 12/2016 |

OTHER PUBLICATIONS

Written Opinion of the International Searching Authority (PCT/ISA/237) issued in PCT/JP2018/008575, dated Jun. 12, 2018.

Extended European Search Report, dated Nov. 9, 2020, for European Application No. 18764716.9.

Xu et al., "Increasing the Thermal Conductivity of Boron Nitride and Aluminum Nitride Particle Epoxy-Matrix Composites by Particle Surface Treatments," Composite interfaces. Vol. 7, No. 4, 2000 (Jan. 2, 2000), pp. 243-256 (total 16 pages). XP055745336.

* cited by examiner

ALUMINUM NITRIDE POWDER CONTAINING NO COARSE PARTICLES

TECHNICAL FIELD

The present invention relates to aluminum nitride containing no coarse particles. More specifically, it relates to an aluminum nitride powder which contains an extremely small number of coarse particles and is suitable for filling in narrow gaps and for manufacturing a thin resin sheet.

BACKGROUND ART

Due to recent demand for small-sized and high-performance electronic parts, the integration of semiconductor devices is becoming higher, the use of a heat radiation material which releases heat generated from a device efficiently is growing, and further the improvement of the heat radiation performance of the material is desirable. Various heat radiation materials are used to release heat generated from a semiconductor device to a heat sink or housing. Ceramic substrates such as aluminum nitride or silicon nitride substrates having high heat conductivity are used more and more as substrates mounting parts. The use of a metal base substrate having a heat radiation insulation resin layer on a metal sheet is growing, and alumina, aluminum nitride or boron nitride is filled in the resin layer as a filler having high heat conductivity. A highly heat-conductive filler is being used as a sealing material, adhesive or grease around a semiconductor device, and how heat is released efficiently is becoming important.

Silica has been mainly used as a resin sealing filler, and importance is attached to the formation of spherical particles and the control of particle size distribution in order to improve filling property and flowability as the characteristic properties of a filler. Since spaces to be filled by a sealing material are now becoming smaller due to the size reduction and high integration of a semiconductor device, coarse particles are being removed from silica powders (Patent Document 1). When coarse particles are contained in the filler and the filler is to be filled in spaces, clogging occurs, thereby causing problems such as uneven filling, the formation of a void and a molding failure. The existence of agglomerated particles may cause the deterioration of flowability. Since heat radiation property is desirable for sealing materials, it is expected that the necessity to remove coarse particles from a highly heat-conductive filler will increase. Patent Document 2 proposes technology for the wet classification of particles with a liquid cyclone to which an electrostatic field is applied. However, an aluminum nitride powder in which the amounts of coarse particles and agglomerated particles are controlled has not been reported.

Meanwhile, Patent Document 3 proposes a highly heat-conductive filler composed of a surface coated aluminum nitride sintered powder having a boehmite film with 2 to 5 OH groups/$nm^2$ on the surface of an aluminum nitride sintered powder and further coated with a silane coupling agent.

PRIOR ART DOCUMENTS

Patent Document 1: JP-A 2015-86120
Patent Document 2: JP-A 2011-125801
Patent Document 3: JP-A 2002-53736

DISCLOSURE OF THE INVENTION

Problem to be Solved by the Invention

It is therefore an object of the present invention to provide a highly heat-conductive filler which is classified to be advantageously used for the materialization of a resin composition which can be filled in small spaces and a thin film heat radiation resin sheet by removing unnecessary coarse particles from an aluminum nitride powder.

Means for Solving the Problem

The inventors of the present invention conducted intensive studies to attain the above object and found that a resin composition able to be filled in small spaces can be produced from an aluminum nitride powder containing a very small amount of coarse particles by classification and having a cumulative volume 50% particle diameter D50 of 0.5 to 7.0 μm in particle size distribution measured with a laser diffraction scattering particle size distribution meter, a ratio of cumulative volume 90% particle diameter D90 to D50 (=D90/D50) of 1.3 to 3.5 and a BET specific surface area of 0.4 to 6.0 $m^2/g$.

The specific invention is as follows.

[1]

An aluminum nitride powder having a cumulative volume 50% particle diameter D50 of 0.5 to 7.0 μm in particle size distribution measured with a laser diffraction scattering particle size distribution meter, a ratio of cumulative volume 90% particle diameter D90 to D50 (=D90/D50) of 1.3 to 3.5 and a BET specific surface area of 0.4 to 6.0 $m^2/g$, wherein when resin paste obtained by mixing together 150 parts by mass of the aluminum nitride powder and 100 parts by mass of silicone oil having a kinetic viscosity at 25° C. of 1,000 cSt is measured with a grind gauge, the upper limit particle diameter at which a linear mark is produced is not more than 5 times as large as D90.

[2]

The above aluminum nitride powder, wherein the number of hydroxyl groups on the surface of an oxide film is smaller than 2/$nm^2$.

[3]

The above aluminum nitride powder which is further treated with a surface modifier.

[4]

The above aluminum nitride powder which has a carbon content of 0.001 to 0.35 mass %.

[5]

The above aluminum nitride powder, wherein the surface modifier is a silane compound or silazane compound, and the number of carbons of an organic functional group having the largest number of carbons excluding the hydrolyzable group of the silane compound or an organic functional group having the largest number of carbons of the silazane compound is not larger than 9.

[6]

A resin composition comprising the above aluminum nitride powder and a resin.

Effect of the Invention

Since the classified aluminum nitride powder of the present invention contains a very small amount of coarse particles, a resin composition comprising a resin and the aluminum nitride powder has excellent filing property in small spaces.

Therefore, the aluminum nitride powder of the present invention rarely experiences a gap filling failure or a permeation failure and enables excellent sealing operation when it is used for underfill sealing.

BEST MODE FOR CARRYING OUT THE INVENTION

Figure 1:
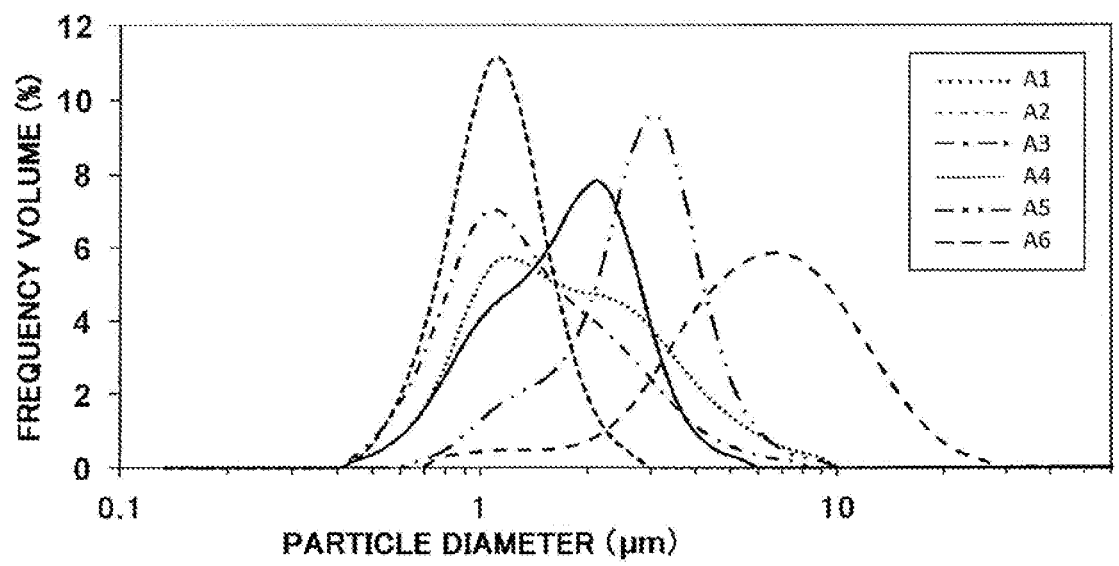
FIG. 1 This shows the relationship between the frequency volume (%) and particle diameter of a raw material aluminum nitride powder measured with a laser diffraction scattering particle size distribution meter.

The aluminum nitride powder of the present invention has a cumulative volume 50% particle diameter D50 of 0.5 to 7.0 μm particle size distribution measured with a laser diffraction scattering particle size distribution meter and a ratio of cumulative volume 90% particle diameter D90 to D50 (=D90/D50) of 1.3 to 3.5.

A more detailed description of the measurement with the laser diffraction scattering particle size distribution meter is given below. That is, the aluminum nitride powder is dispersed in ethanol to a concentration of 1 mass % by carrying out about 200 W ultrasonic irradiation for 3 minutes. This dispersion is used to measure the particle size distribution of the aluminum nitride powder by using the laser diffraction scattering particle size distribution meter. In a particle diameter volume frequency distribution, the particle diameter value at which the cumulative value obtained by accumulating volume frequencies from smaller particle diameters becomes 50% is taken as D50, the particle diameter value at which the cumulative value becomes 90% is taken as D90, and the largest particle size counted as a particle is taken as a maximum count particle size.

The aluminum nitride powder of the present invention shows the above particle diameter within the range measured by this method and may form an agglomerate before it is dispersed in ethanol. Therefore, the aluminum nitride powder of the present invention may be existent as a granule which is an agglomerate before dispersion.

The aluminum nitride powder of the present invention has a D50 of 0.5 to 7.0 μm. An aluminum nitride powder having a D50 smaller than 0.5 μm cannot be actually obtained. When D50 is larger than 7.0 μm, precise classification becomes difficult. D50 is preferably 0.8 to 6.0 μm.

The aluminum nitride powder of the present invention has a D90/D50 ratio of 1.3 to 3.5. An aluminum nitride powder having a D90/D50 ratio lower than 1.3 cannot be actually obtained. When the D90/D50 ratio is higher than 3.5, it is difficult to remove coarse particles having a particle diameter larger than the targeted value at the time of classification. The D90/D50 ratio is preferably 1.5 to 2.5.

The big feature of the aluminum nitride powder of the present invention is that, when resin paste obtained by mixing together 150 parts by mass of the aluminum nitride powder and 100 parts by mass of silicone oil having a kinetic viscosity at 25° C. of 1,000 cSt is measured with a grind gauge (particle size gauge), the upper limit particle diameter at which a linear mark or streak is produced is not more than 5 times as large as D90.

That is, as the aluminum nitride powder of the present invention contains no coarse particles, when it is used as an underfill sealing material, an excellent effect that a gap filling failure or a permeation failure hardly occurs is obtained.

In the measurement of particle size distribution by means of a laser diffraction scattering particle size distribution meter, since only particles contained in a predetermined amount or more are counted, in general, even actually existent particles do not appear in the particle size distribution. Although a very small amount of coarse particles whose diameter is more than 5 times as large as D90 may not be captured in the measurement of a conventionally known aluminum nitride powder by using a laser diffraction scattering particle size distribution meter, an extremely small amount of coarse particles can be captured by measurement with a grind gauge as they produce a linear mark or streak. Even this extremely small amount of coarse particles cause a problem when the aluminum nitride powder is actually used as a filler.

In the present invention, the preferred upper limit particle diameter is not more than 4 times, more preferably not more than 3 times, particularly preferably not more than 2 times as large as D90.

The aluminum nitride powder of the present invention has a BET specific surface area measured by a nitrogen adsorption one-point method of 0.4 to 6.0 $m^2/g$. When the BET specific surface area is smaller than 0.4 $m^2/g$, D50 becomes larger than 7 μm. On the other hand, an aluminum nitride powder having a BET specific surface area larger than 6.0 $m^2/g$ cannot be actually obtained.

The aluminum nitride powder of the present invention has an oxide film on the surface. The number of the hydroxyl groups on the surface of this oxide film is preferably smaller than $2/=^2$. When this oxide film is existent, the hydrolyzability of aluminum nitride is suppressed. When the oxide film is not existent, the number of the hydroxyl groups becomes very small. When the oxide film is formed, according to synthesizing conditions and storage conditions after synthesis, part of aluminum oxide is apt to be hydrolyzed to become aluminum hydroxide, whereby a large number of hydroxyl groups may be existent. However, when hydrolysis proceeds partially, there exists an unstable situation in which hydrolysis is apt to proceed thereafter and a water molecule is apt to be adsorbed, which is not preferred from the viewpoint of quality stability. Also, the formation of aluminum hydroxide causes the reduction of heat conductivity. Therefore, it is preferred that hydrolysis should be avoided as much as possible while the oxide film is formed and the number of hydroxyl groups on the surface should be smaller than $2/nm^2$ to obtain high heat conductivity. The number of the hydroxyl groups is more preferably not larger than $1.7/nm^2$.

The aluminum nitride powder of the present invention may be treated with a surface modifier. The surface of the aluminum nitride powder is modified by the surface modifier, thereby obtaining the effect of preventing the agglomeration of the powder and an effect when the powder is filled in a resin as a filler. In the production method which will be described hereinafter, when the powder is treated with a surface modifier before wet classification, production becomes easy.

Surface modification has three advantages. The first one is the prevention of the agglomeration of the powder, the second one is for classification operation, and the third one is obtained when the powder is filled in a resin as a filler.

A detailed description of the prevention of agglomeration is given below. Agglomeration is a state that particles are strongly bonded together by a hydrogen bond between hydroxyl groups on the surface to form a big block object. Therefore, the bonding of particles becomes weak by surface modification, whereby the particles hardly agglomerate.

The advantage obtained when the aluminum nitride powder which has been surface modified is filled in a resin as a filler includes the reduction of viscosity and the improvement of filling rate, heat conductivity, the moisture durability and insulation reliability of a resin cured body, the mechanical strength of a resin cured body by the provision of a functional group suitable for the resin and adhesive strength. The reduction of viscosity in particular is particularly advantageous as it can be expected that permeability in small spaces becomes high due to the improvement of the flowability of the filled resin composition.

The surface modifier may be uniformly distributed over the entire surface of the aluminum nitride powder, or the surface of each particle may be treated with an aggregate of modifier molecules. Or, each particle may not be treated with the same amount of a modifier molecule. In the analytical results of a plurality of samples collected from the powder at random, there may be a difference in the amount of the modifier to be detected (for example, the amount of carbon derived from the modifier). Permissible variations in the analytical results are desirably less than 40% larger or smaller than the average value of the samples. When the variations are too large, viscosity characteristics vary disadvantageously when the powder is filled in a resin.

The surface modifier is preferably a surface modifier which forms a chemical bond with aluminum nitride or the surface oxide film. As the modifier forming a chemical bond, general surface treating agents which are used as fillers such as silica may be used without a problem. The surface treating agents include silane compounds, silazane compounds, aluminate coupling agents and titanate coupling agents. Out of these, silane compounds and silazane compounds (to be collected referred to as "silylating agents" hereinafter, and treatment with a silylating agent is referred to as "silylation" hereinafter) which enable surface modification without unevenness can be advantageously used. However, out of the silylating agents, a silylating agent having 9 or less carbons constituting a functional group except for hydrolyzable group is preferred. When the silylating agent has a plurality of organic groups, the number of carbons is the number of carbons of an organic group having the largest number of carbons. For example, when the silylating agent is hexylmethyl dimethoxysilane $(C_6H_{13}Si(CH_3)(OCH_3)_2)$, the number of carbons is counted as 6. Since a silane compound having a large number of carbons, that is, a silylating agent having a long functional group chain has strong interaction between organic groups and is apt to be existent as a polymer, the whole aluminum nitride powder is hardly treated uniformly and is apt to become partially agglomerated. The powder produces a linear mark or streak with a grind gauge when it is filled in a resin as a filler while it contains coarse particles, thereby causing a gap filling failure or a permeation failure.

In the present invention, surface modifiers may be used alone or in combination of two or more for the treatment.

A detailed description is subsequently given of a case in which a silane compound is used out of silylating agents for aluminum nitride treated with a surface modifier of the present invention. The aluminum nitride powder treated with silane refers to an aluminum nitride powder in which a bond between silane and the surface is formed by the dehydration condensation of part or all of the silane compound with the hydroxyl group of an aluminum oxide layer on the surface of aluminum nitride. Bonding between silane and the surface refers to a state that the silane treated powder is dispersed in an organic solvent and then a predetermined amount of silane is not washed away and remains in a powdery form even after solid-liquid separation. In the present invention, part of the silane used for the treatment does not need to form a bond and may be washed away.

The silane does not need to form a treated layer having uniform thickness on the surface of each particle, and parts where the silane is existent and parts without the silane may be in a sea-island form. This is because the oxide film on the surface of aluminum nitride is not even itself and there are at least three possibilities. One of them is that part of the surface of aluminum nitride is exposed, the second one is that the reactive hydroxyl groups of the aluminum oxide layer are not distributed uniformly for the same reason, and the third one is that a polymer is formed by silane compounds adhered to the surface at the time of heating. Therefore, the formation of a uniform silane treated surface itself may be difficult.

Since the aluminum nitride powder has a small specific surface area and a low surface hydroxyl group density, all the hydrolysable groups, for example, alkoxy groups and halogen groups of the silane compound may not be reacted.

Since the amount of silane remaining on the surface without being washed away changes according to the amount of silane which was brought into contact with the powder at first, it is difficult to specify the amount of silane but about 50 to 70% of silane preferably remains. A larger amount of the remaining silane is desirable as the physical properties of the powder become more stable. As for bonding with the surface, all the silane molecules do not need to be bonded likewise, and silane molecules may be bonded to the surface independently, a polymer may be formed by the condensation of the hydrolyzable groups of two or more silane molecules and bonded to the surface at one point or multiple points, or a polymer having a high molecular weight may be adsorbed to the surface and existent in such a manner that it is hardly washed away.

Examples of the silane compound are given below. Silane compounds having 9 or less carbons constituting a functional group and a reactive functional group as the functional group include alkoxysilanes such as 3-glycidoxypropyl trimethoxysilane, 3-glycidoxypropyl triethoxysilane, 3-glycidoxypropylmethyl dimethoxysilane, 3-glycidoxypropylmethyl diethoxysilane, 2-(3-,4-epoxycyclohexyl)ethyl trimethoxysilane, 3-methacryloxypropyl trimethoxysilane, 3-methacryloxypropyl triethoxysilane, 3-methacryloxypropylmethyl dimethoxysilane, 3-methacryloxypropylmethyl diethoxysilane, 3-acryloxypropyl trimethoxysilane, 3-mercaptopropyl trimethoxysilane, 3-aminopropyl trimethoxysilane, 3-aminopropyl triethoxysilane, 2-aminoethyl-3-aminopropyl trimethoxysilane, 2-aminoethyl-3-aminopropylmethyl dimethoxysilane, 3-dimethylaminopropyl trimethoxysilane, 3-diethylaminopropyl trimethoxysilane, 3-triethoxysilyl-N-(1,3-dimethylbutylidene)propylamine, N-phenyl-3-aminopropyl trimethoxysilane, vinyl trimethoxysilane, vinyl triethoxysilane, p-styryl trimethoxysilane and allyl trimethoxysilane.

Silane compounds having 9 or less carbons constituting a functional group and an alkyl group or fluoroalkyl group as the functional group include methyl trimethoxysilane, dimethyl dimethoxysilane, dimethyl diethoxysilane, trimethyl methoxysilane, ethyl trimethoxysilane, n-propyl trimethoxysilane, isobutyl trimethoxysilane, isobutyl triethoxysilane, n-hexyl trimethoxysilane, n-hexyl triethoxysilane, cyclohexyl trimethoxysilane, cyclohexylmethyl dimethoxysilane, n-octyl triethoxysilane, phenyl trimethoxysilane, phenyl triethoxysilane, diphenyl dimethoxysilane, diphenyl diethoxysilane, trifluoropropyl trimethoxysilane, trifluoropropylmethyl dimethoxysilane and nonafluorohexyl triethoxysilane.

Other silanes having 9 or less carbons constituting a functional group include chlorosilanes such as vinyl trichlorosilane, methyl trichlorosilane, dimethyl dichlorosilane, trichloromethyl silane, ethyl dimethylchlorosilane, propyl dimethylchlorosilane, phenyl trichlorosilane, trifluoropropyl trichlorosilane and isopropyldiethyl chlorosilane.

Examples of the silazane compound include hexamethyl disilazane, tetramethyl disilazane, divinyltetramethyl disilazane, diphenyltetramethyl disilazane, bis(trifluoropropyl)tetramethyl disilazane, hexamethyl cyclotrisilazane, trimethyltrivinyl cyclotrisilazane and octamethyl cyclotetrasilazane.

The aluminum nitride powder treated with a surface modifier contains carbon derived from the surface modifier. The content of carbon is preferably 0.001 to 0.35 mass %.

The method of producing the aluminum nitride powder of the present invention is not particularly limited. According to studies conducted by the inventors of the present invention, the following method can be advantageously used to produce the aluminum nitride powder.

Roughly speaking, a raw material aluminum nitride powder having a predetermined particle size distribution is prepared and classified to remove coarse particles, thereby making it possible to obtain the aluminum nitride powder of the present invention. Classification may be dry classification or wet classification, preferably wet classification.

When the oxide film is formed, it is preferably formed by heating in an oxidizing atmosphere before classification. The treatment with a surface modifier may be carried out before classification, preferably simultaneously with wet classification.

When wet classification is carried out, drying and optionally disintegration are carried out after classification.

These operations will be described in detail hereinunder.
[Raw Material Aluminum Nitride Powder]
<Production Method>

As the raw material aluminum nitride powder in the production method of the present invention, an aluminum nitride powder produced by a conventionally known method may be used without restriction. In the present invention, the aluminum nitride powder before classification and surface modification are carried out is referred to as "raw material aluminum nitride powder". As the method of producing the raw material aluminum nitride powder in the present invention, for example, direct nitridation, reduction nitridation and vapor-phase synthesizing methods may be employed.

<Particle Size Distribution>

As the raw material aluminum nitride powder in the present invention, a powder having a cumulative volume 50% particle diameter D50 of 0.5 to 7.0 lam in particle size distribution measured with a laser diffraction scattering particle size distribution meter, a ratio of cumulative volume 90% particle diameter D90 to D50 (=D90/D50) of 1.3 to 3.5 and a BET specific surface area of 0.4 to 6.0 $m^2/g$ and containing none or a very small amount of particles having a particle diameter which is more than 5 times as large as D90 when measured with the laser diffraction scattering particle size distribution meter is preferred as it is easily produced by wet classification which will be described hereinafter.

In the particle size distribution of the aluminum nitride powder measured by the above measuring method, one or two maximum volume frequency values are desirably existent. In the case of a particle size distribution having two or more maximum values, it is desirable that a maximum frequency value on a small particle diameter side should be larger. When the maximum values are biased on a large particle side at the time of collecting particles on the small particle diameter side by classification which will be described hereinafter, classification efficiency tends to deteriorate, the recovery rate of particles on the small diameter side lowers, and coarse particles which should be removed are contained in a fine powder after classification.

The aluminum nitride powder having this particle size distribution is easily obtained by using a reduction nitriding method. Stated more specifically, by using an alumina raw material having a particle size close to D50 and D90 of the aluminum nitride powder to be produced, an aluminum nitride powder of interest can be obtained. Since a high temperature is applied in the reduction nitriding method, a sintered agglomerate of a plurality of particles may be formed but the sintered agglomerate is disintegrated with a ball mill or jet mill as required.

In the aluminum nitride powder produced by this method, the amount of coarse particles having a particle diameter more than 5 times as large D90 is so small that they are not detected by measurement with a laser diffraction scattering particle size distribution meter. However, it cannot be said that these coarse particles are not existent at all but they are detected by wide-range SEM observation, or the existence of coarse particles is easily confirmed from the formation of a linear mark or streak by measurement with a grind gauge.

<Impurities>

The raw material aluminum nitride of the present invention may contain up to 5 parts by mass of impurities such as alkali rare elements and rare earth elements which are derived from the raw material or added intentionally in the synthesizing method. Boron nitride which is an impurity derived from an agglomeration inhibitor or setter may be contained in an amount of up to 5 parts by mass. The amount of an impurity which greatly deteriorates the crystallinity of aluminum nitride is not preferred as it causes the reduction of heat conductivity. The content of aluminum nitride in the raw material aluminum nitride powder is preferably not less than 90%, more preferably not less than 95%.

<Oxide Film>

The raw material aluminum nitride powder used in the present invention preferably has an aluminum oxide layer on the surface to suppress hydrolyzability or to enhance the treatment efficiency of surface modification which will be described hereinafter. Stated more specifically, it is desirable that an Al—O—Al bond or Al—OH group should be existent on the surface of each particle constituting the raw material aluminum nitride powder. This aluminum oxide layer may be an oxide film layer which is formed by natural oxidation when the raw material aluminum nitride powder is stored or an oxide film layer which is formed by an oxidizing step which is carried out intentionally. This oxidizing step may be carried out in the production process of the raw material aluminum nitride powder or as a separate step after the raw material aluminum nitride powder is produced. For example, as the raw material aluminum nitride powder obtained by the reduction nitriding method undergoes the oxidizing step in the production process to remove carbon used at the time of a reaction, an aluminum oxide layer is existent on the surface. The oxidizing step may be additionally carried out on the aluminum nitride powder obtained by the reduction nitriding method.

<Oxidation>

When the oxidizing step is additionally carried out as a separate step, the conditions of the step are as follows. By heating the raw material aluminum nitride powder obtained by each method in an oxygen-containing atmosphere at preferably 400 to 1,000° C., more preferably 600 to 900° C. for preferably 10 to 600 minutes, more preferably 30 to 300 minutes, the aluminum oxide layer can be formed on the surface of each raw material aluminum nitride particle. As the above oxygen-containing atmosphere, for example, oxygen, air, water vapor or carbon dioxide may be used but the above step is preferably carried out in air, particularly under atmospheric pressure from the relationship with the object of the present invention.

Meanwhile, when oxidation is carried out at a temperature higher than 900° C., a thick oxide film may be formed on the surface of aluminum nitride and this aluminum oxide film differs from the core of aluminum nitride in heat expansion coefficient, thereby making it impossible to maintain a uniform film with the result that the film may be broken and the aluminum nitride surface of the core may be exposed, which causes the reduction of hydrolysis resistance. Therefore, the oxidizing conditions should not be too strict. The thickness of the aluminum oxide layer which does not greatly reduce the heat conductivity of the aluminum nitride powder is preferably 0.005 to 0.2% of the diameter of each particle.

<Surface Hydroxyl Group>

The number of the surface hydroxyl groups of the raw material aluminum nitride powder is less than $2/nm^2$ whether the raw material aluminum nitride powder is oxidized or not. The surface hydroxyl group is preferably derived from the aluminum oxide layer on the surface.

<Particle Shape>

The shape of each of the primary particles of the raw material aluminum nitride powder in the present invention is not particularly limited and may be any shape such as indeterminate, spherical, polyhedral, columnar, whisker-like or plate-like shape. Out of these, a spherical shape having excellent viscosity characteristics and the high reproducibility of heat conductivity is preferred for use as a filler. A smaller aspect ratio is preferred for classification operation as coarse particles are more rarely contained. The preferred aspect ratio is 1 to 3.

The coarse particles in the present invention refer to both primary particles and higher order agglomerated particles. When a higher order agglomerate is disintegrated by kneading with a liquid resin or dispersion in a solvent, if it is apparently a coarse particle, it is not treated as a coarse particle.

<Classification Operation>

The aluminum nitride powder of the present invention can be obtained by classifying the above raw material aluminum nitride powder to remove coarse particles having a particle diameter larger than a certain value.

<Classification Method>

Dry classification and wet classification may be employed. Dry classification is roughly divided into sieve classification and air flow classification. Although sieve classification is suitable for a relatively large powder, when the particle diameter is small, passableness greatly deteriorates due to the agglomeration of a powder. Coase particles can be removed by air flow classification and wet classification more effectively. When air flow classification is compared with wet classification, the number of remaining coarse particles after classification is smaller in wet classification than air flow classification.

<Air Flow Classification>

Air flow classification is to disperse a powder in an air flow and divide it into fine particles and coarse particles by the gravity or inertia force of the particles or centrifugal force. Accuracy suitable for the classification of particles as large as several μm is obtained by classifiers making use of inertia force and centrifugal force.

As means making use of inertia force, there are an impactor type classifier which separates fine particles from coarse particles by providing a guide blade in the apparatus to create a swirl flow so as to curve particulates accelerated by the air flow, a semi-free vortex centrifugal classifier which carries out classification by applying centrifugal force to particles, and a Coanda type classifier making use of a Coanda effect. Examples of the classifier making use of inertia force include cascade impactor, viable impactor, aerofine classifier, eddy classifier, elbow jet and hyperplex.

As means making use of centrifugal force, there are free vortex and forced vortex classifiers which separate fine particles from coarse particles by making use of a spiral air flow. Examples of the free vortex classifier include cyclone without a guide blade, multi-stage cyclone, turboplex which promotes the prevention of agglomeration using secondary air, dispersion separator which enhances classification accuracy by providing a guide blade, microspin and microcut. The forced vortex classifier enhances classification accuracy by applying centrifugal force to particles with a rotor in the apparatus and creating another air flow in the apparatus and includes a turbo classifier and Dona Selec.

<Wet Classification Operation>

Wet classification has two systems: one is a system in which a powder is dispersed in a solvent and let pass through a filter to remove coarse particles and the other one is a fluid classification system in which a powder is made fluid to separate fine particles from coarse particles. The filter classification system has high accuracy and can have high production capacity.

<Wet Filter Classification>

This is a classification method in which a powder is dispersed in a solvent to disintegrate agglomerates and the resulting dispersion is let pass through a filter. The classification point, classification accuracy and the degree of clogging differ according to the material, structure and shape of the filter.

As the filter, a membrane filter, resin mesh, metal mesh and paper filter may be used. As for the shape of the filter, the filter may have a plate-like, multi-layer or pleat structure or may be of a cartridge type. It is important that a filter free from clogging should be selected as the object of the present invention is to remove coarse particles contained in the powder. As a filter having high particle passableness, a track etched membrane filter, depth filter, sieve, electroformed screen and a nylon or polypropylene woven mesh may be preferably used.

Although resins and stainless steel are preferred as the filter material to remove impurities, a material containing a component which elutes upon contact with a dispersion medium should be avoided and a material suitable for use with a solvent is desirably selected.

When the dispersion is let pass through the filter, it may be let pass through a fine filter from the beginning or through a coarse filter first to remove coarse particles and then through a fine filter. As the coarse filter, a filter having a mesh size which is 15 to 50 times as large as D90 is preferred. As the fine filter, a filter having a mesh size which is not more than 5 times, generally 3 to 5 times as large as D90 is used.

For instance, to remove coarse particles having a D90 of not less than 8 μm which is 5 times as large as D90 of a powder having a D90 of 1.6 μm from the powder, the powder is let pass through a filter having a large mesh size of 45 μm and then through a filter having a mesh size of 8 μm.

At the time of classification operation, a dispersion containing the powder is let pass through the filter. The method of letting the dispersion pass through the filter may employ any system such as gravity, suction, pressure or pressure feed system. Since the risk of causing clogging becomes high when the dispersion is forcedly let pass through the filter, suitable conditions such as the concentration of the powder, passage time and the mesh size of the filter must be selected.

<Dispersion Solvent for Wet Classification>

For wet classification, the powder must be dispersed in a solvent. Any solvent is acceptable if it can disperse the aluminum nitride powder. Use of water should be avoided as aluminum nitride is hydrolyzable and a strong agglomerate is formed at the time of drying after classification operation. Any organic solvent may be used if it does not contain a large amount of water. Preferred examples of the organic solvent include alcohols such as methanol, ethanol, propanol, isopropyl alcohol and butanol, ketones such as acetone, methyl ethyl ketone, diethyl ketone and methyl isobutyl ketone, ethers such as diethyl ether, dioxane, ethylene glycol monomethyl ether, propylene glycol monomethyl ether and tetrahydrofuran, alkanes such as hexane, 2-methylpentane, heptane, cyclohexane, octane, 2,2,4-trimethylpentane and petroleum ethers, esters such as ethyl formate, butyl formate, ethyl acetate, propyl acetate and butyl acetate, and aromatic hydrocarbons such as benzene, toluene, xylene and naphthalene. These solvents may be used alone or in combination of two or more.

Out of these solvents, alcohols, ketones and ethers are preferred, and alcohols are more preferred as the solvent which can dissolve the surface modifier completely and has high dispersibility for the aluminum nitride powder. Out of the alcohols, lower alcohols such as methanol, ethanol and isopropyl alcohol are preferred as they have such a low boiling point that they are easily removed by evaporation.

<Amount of Dispersion Solvent>

The most suitable amount of the solvent is preferably 100 to 1,900 parts by mass, more preferably 150 to 900 parts by mass based on 100 parts by mass of the raw material aluminum nitride powder. When the amount of the solvent is not smaller than 150 parts by mass, the viscosity of slurry containing the aluminum nitride powder and the solvent can be reduced to improve the dispersibility of the aluminum nitride powder. When the amount of the solvent is not larger than 900 parts by mass, the evaporation time of the solvent can be shortened, thereby making it possible to reduce cost.

<Dispersion Method>

Most of the aluminum nitride powder before it is mixed with the solvent is agglomerated in most cases. Therefore, it is not completely dispersed simply by mixing with the solvent, whereby it causes clogging at the time of wet classification, or the surface modifier which is added at the same time does not spread to the inside of the agglomerate, thereby producing an unevenly surface modified product which affects viscosity characteristics.

As an apparatus suitable for making the slurry in a high dispersion state, for example, a collisional disperser such as disposer, homogenizer, ultrasonic wave disperser, nanomizer, planetary mixer having a shearing effect, ejector, water jet mill or high-pressure disperser may be used. A wet ball mill, wet vibration ball mill or wet bead mill all of which are capable of dispersing in such a mild condition that the particle size distribution does not change may also be used. A method in which impact greater than required is applied to pulverize even the primary particles of aluminum nitride should be avoided as a surface without an oxide film may be exposed. Out of the above dispersers, a disposer, homogenizer and ultrasonic wave disperser are preferred. The reduction of the concentration of the powder to be dispersed in the solvent is effective in facilitating filter classification.

<Solvent Removal/Drying>

In the present invention, to obtain the classified aluminum nitride powder after wet classification operation, the solvent must be removed from the above slurry. Although the method of removing the solvent is not particularly limited, there are the following three methods. The first one is an evaporation drying method in which all the solvent is removed by drying. The second one is a two-step method consisting of the step of drying the solvent roughly and the drying step of removing the solvent completely. The third one is a two-step method consisting of the step of separating a solid component from a liquid component and the drying step of removing the solvent completely.

<Drying Method>

In the first method, a heating system which can evaporate and remove the solvent from the slurry containing the aluminum nitride powder may be used. A conical dryer, drum dryer, V-type dryer, vibration dryer, rocking mixer, Nauter mixer, Ribocone, vacuum granulator, vacuum emulsifier and other stirring type vacuum dryers may be advantageously used. Details of the step up to final drying will be described in the following section for the drying step.

In the second method, an apparatus which volatilizes the solvent from the slurry may be used. Examples of the apparatus include rotary evaporator, thin film dryer, spray dryer, drum dryer, disk dryer and fluid bed dryer.

The third method is a filtering method, and an apparatus which separates the slurry into a solid component and a liquid component may be advantageously used. Examples of the apparatus include suction filter, centrifugal filter, decanter, Gina type centrifuge, pressure filter, filter press and filter dryer which can carry out filtration and drying with one unit. The material of a filter in use, the retained particle diameter and separation conditions may be suitably selected according to the method in use and collection efficiency.

Out of the above methods of removing the solvent, the first method in which all the solvent can be removed in one stage is preferred from the viewpoint of cost. When a surface modifier is added, this method is superior to the third method as the amount of the surface modifier on the surface of each particle hardly varies. When the solvent is removed by the first method, it can be considered that all the amount of the surface modifier in use is adsorbed to the surface of aluminum nitride.

It is desirable that the solvent in use is completely removed in the final dried product of the aluminum nitride powder which has been wet classified of the present invention. The final dried product refers to a product having a mass loss rate of the aluminum nitride powder classified right after drying, that is, a mass loss rate of less than 0.5% when the powder is dried at 120° C. in the atmosphere.

The atmosphere in the drying step is preferably an under reduced pressure, inert gas or dry air atmosphere. The under pressure and inert gas atmospheres are preferred as the influence of a moisture content in the environment is small, and the under reduced pressure atmosphere is more preferred.

The final dried product obtained after the drying step may be subjected to an additional heat treatment. When the surface modifier is added, additional heating has the effect of promoting a reaction between the modifier and the aluminum nitride surface, whereby the desorption of the modifier from the surface hardly occurs. The amount of the hydrolyzable residue of the surface modifier is reduced by heating, thereby making it possible to enhance the storage stability of the classified aluminum nitride powder.

The temperature of additional heating is not lower than the temperature in the drying step which is carried out in the previous step. The specific temperature is preferably 70 to 150° C., more preferably 80 to 120° C. When the heating temperature is lower than 70° C., the effect of additional heating becomes small. When the temperature is higher than 150° C. and the surface modifier is added, particles readily agglomerate as the surface modifiers condensate between particles.

As a heater for additional heating, a ventilating dryer, convection type dryer, vacuum dryer, conical dryer, drum dryer, V-type dryer, vibration dryer, rocking mixer, Nauter mixer, Ribocone, vacuum granulator, vacuum emulsifier and other stirring type vacuum dryers may be preferably used.

The atmosphere for additional heating is desirably an under reduced pressure, inert gas or dry air atmosphere. The under pressure and inert gas atmospheres are preferred as the influence of a moisture content in the environment is small, and the under reduced pressure atmosphere is more preferred.

[Disintegration]

Although the aluminum nitride powder which has been wet classified of the present invention is obtained by drying (including additional heating) as described above, the obtained aluminum nitride powder may be in a strongly agglomerated state. Stated more specifically, since the powder which is composed of a mixture of primary particles and agglomerates of primary particles or mostly of agglomerated particles has low operation efficiency as it is and may not be fully dispersed when it is kneaded with a resin, the disintegration of the powder is carried out as required.

The disintegration method is preferably dry disintegration. A relatively mild method in which agglomerates formed by drying the slurry are pulverized is desirable. When an apparatus and conditions for pulverizing primary particles and even secondary particles having particle boundaries formed by strongly sintering primary particles are employed, a surface without an oxide film is exposed and the powder may be easily hydrolyzed. The atmosphere for disintegration is desirably an air or inert gas atmosphere.

The humidity of the atmosphere is preferably not too high, specifically lower than 70%, more preferably lower than 55%.

Examples of the disintegration apparatus include dry disintegration machines such as stone mill, crusher, cutter mill, hammer mill and pin mill. Out of these, a stone mill which can pulverize an agglomerate in a short time and rarely pulverizes it unevenly is preferred. After coarse disintegration, coarse particles may be removed by a vibration sieve. When a stone mill is used, preferably, the rotation speed is set to 500 to 3,000 rpm and the distance between upper and lower grindstones is set to a value which is 30 to 200 times as large as the average particle diameter d50 (unit: μm) of the aluminum nitride powder in order to obtain good results. The diameter of the grindstone is suitably determined according to the amount of the first aluminum nitride powder to be disintegrated.

[Classified Powder]

The powder classified by the above operation is an aluminum nitride powder from which coarse particles have been removed and has a cumulative volume 50% particle diameter D50 of 0.5 to 7.0 μm in particle size distribution measured with a laser diffraction scattering particle size distribution meter and a ratio of cumulative volume 90% particle diameter D90 to D50 (=D90/D50) of 1.3 to 3.5 and a BET specific surface area of 0.4 to 6.0 $m^2/g$ and, when resin paste obtained by mixing 150 parts by mass of the aluminum nitride powder with 100 parts by mass of silicone oil having a kinetic viscosity at 25° C. of 1,000 cSt is measured with a grind gauge, the upper limit particle diameter at which a linear mark or streak is produced is not more than 5 times as large as D90.

[Surface Modification]

The aluminum nitride powder of the present invention may be further treated with a surface modifier as described above.

<Effect of Surface Modification>

In the present invention, when surface modification is not carried out at the time of removing the solvent after wet classification, a strong agglomerate may be formed. In this case, even when coarse particles are removed from the powder by classification operation and the powder is used as a filler, the agglomerate is not dispersed in a resin and functions as a coarse particle, thereby making it impossible to forma thin film or deteriorating permeability into small spaces. This risk can be reduced by surface modification. The second effect of classification operation is that classification efficiency is improved as bonding between particles becomes weak like the effect of preventing agglomeration by surface modification. The effect of improving the recovery rate of fine particles can be expected from dry classification as agglomerates are easily disintegrated when the powder is made particulate in an air stream. The effect of improving dispersibility in a solvent due to the agglomeration preventing effect, the recovery rate of fine particles and cut point accuracy can be expected from wet classification in the fluid classification method. The effect of reducing the clogging of a filter with agglomerates can be expected in a classification system using a filter, thereby making it possible to reduce the filter exchange frequency. Since the surface modifier tends to adsorb to the surface of an aluminum nitride particle having a large specific surface area in a fluid, an effect can be expected only when the surface modifier is existent in the fluid.

Therefore, the treatment of aluminum nitride with the surface modifier is preferably carried out before the aluminum nitride is let pass through a filter in wet classification. In this case, a treatment with a surface modifier may be carried out separately from wet classification or simultaneously with the preparation of slurry for wet classification.

To carry out the former surface modification treatment in advance, a dry surface treatment or wet surface treatment can be carried out.

<Dry Surface Treatment>

The dry surface treatment is a method in which dry mixing is carried out without a large amount of a solvent when the aluminum nitride powder is mixed with the surface modifier (method A-1).

Examples of the dry mixing method include one in which a surface modifier is gasified to be mixed with a powder, one in which a liquid surface modifier is sprayed or dropped to be mixed with a powder, and one in which a surface modifier is diluted with a small amount of an organic solvent to increase the amount of a liquid and then sprayed or dropped. The method of gasifying the surface modifier can be employed when a silane compound or silazane compound having high volatility and a low molecular weight is to be treated. The final diluting method is carried out to prevent the surface modifier from being nonuniformly dispersed in the whole powder as the amount of the surface modifier is too small. When the amount of the organic solvent to be used for dilution is too large, the content of a liquid in the whole powder becomes high, causing the formation of a lump or agglomerate. To dilute the surface modifier, the dilution weight rate is preferably 5 to 50 times. In any way, it is important that the surface modifier should be uniformly spread to the whole powder in the drying method.

To mix the surface modifier in the drying method, mixing may be carried out under heating, or heating operation may be carried out separately after the surface modifier is fully mixed at normal temperature. Heating is desirably carried out to firmly fix the surface modifier to the surface of aluminum nitride. However, when heating is carried out at a very high temperature, the surface modifier may volatilize or the condensation of the surface modifiers proceeds excessively, resulting in an uneven treatment. The heating temperature at the time of mixing is preferably 20 to 150° C., particularly preferably 40 to 130° C. When the mixing time is provided at normal temperature before the start of heating, a reaction proceeds after the surface modifier spreads to the whole powder, thereby making it easy to obtain a homogeneous treated powder.

When a silane compound is used as the surface modifier, a silane compound which has been hydrolyzed with an acid or base may be used. Since an acid or base which has been used for hydrolysis, especially a basic material modifies the surface of aluminum nitride, its use should be avoided.

A general mixing stirrer may be used as a dry mixer. Examples of the mixer include planetary mixer, Henschel mixer, super mixer, V-type mixer, drum mixer, double cone mixer and rocking mixer. These apparatuses are desirably provided with a heating function. Heating under agitation can reduce the number of surface modifying steps. Since the powder easily agglomerates by dry mixing, a mixer is desirably provided with a mechanism of disintegrating the formed agglomerate, such as a disintegration blade or chopper. Further, at the time of mixing operation, a thick adhesion layer may be formed not only by the adhesion of the powder but also by the pressing of the powder against the wall of a mixer with a stirring mechanism, whereby the mixing state of the powder cannot be maintained. Therefore, an adhesion preventing means such as fluororesin coat, adhered powder blow-off mechanism such as knocker, or scraping mechanism such as stirring blade is preferably provided on the wall of the mixer.

<Wet Surface Treatment>

The term "wet surface treatment" refers to a method in which the aluminum nitride powder and the surface modifier are mixed together via a solvent. To obtain the aluminum nitride powder containing no coarse particles of the present invention, there are two methods: one in which a powder which has been surface modified by the wet process is supplied to classification operation (method A-2) and the other one in which surface modification and classification operation are carried out at the same time (method B).

In the wet process, the surface modifier can be uniformly spread to all the particles as compared with the dry process, whereby a treating agent rarely becomes uneven and a powder having stable properties is obtained. Meanwhile, a drying step is required. As for the procedure of the wet process, the surface modifier is added to the solvent, the raw material aluminum nitride powder is dispersed in the solvent, and optional heating, the removal of the solvent and drying by heating are carried out in the method (A-2).

The optional heating is aimed to promote a reaction between the surface modifier and the surface of aluminum nitride. Preferably, the heating temperature is about 50 to 120° C. and the time is 60 to 300 minutes.

The surface modifier treated aluminum nitride powder obtained as described above is supplied to classification operation.

The dispersion medium, the dispersion method and the method of removing and drying the solvent used in the method (A-2) are the same as those described in the section for wet classification operation when the above aluminum nitride powder of the present invention is to be produced.

The third method is a method in which surface modification and classification operation are carried out at the same time (method B). In the method B, when slurry is prepared by dispersing the raw material aluminum nitride powder in the solvent to be supplied to wet classification operation, the surface modifier is dissolved in an organic solvent in advance, or the surface modifier is injected into the organic solvent together with the raw material aluminum nitride powder to prepare slurry containing the surface modifier and the raw material aluminum nitride powder coexistent in the organic solvent and supplied to classification operation, and then the solvent is removed, thereby making it possible to obtain the surface modified classified powder.

In this method B, heating is preferably carried out to promote a reaction between the surface modifier and the surface of aluminum nitride as in the method (A-2) in addition to wet classification operation in ordinary wet classification, the removal of the solvent and heat drying. This heating may be carried out before or after wet classification operation.

Although the method B is generally preferred from the viewpoints of a small number of steps and low cost, when a surface modifier which generates ammonia, such as a silazane compound, is used, the method (A-1) or the method (A-2) is preferred as the modification of aluminum nitride is rare.

<Amount of Surface Modifier>

In the reaction between the aluminum nitride powder and the silane compound as the surface modifier, all the reactive groups of silane such as alkoxy groups do not need to form a bond with aluminum nitride as described above. Since a hydroxyl group formed by a reaction between the reactive group and water may break a bond between the formed silane and an aluminum nitride particle, the excessive addition of silane is not preferred. Therefore, the amount of silane is preferably adjusted according to the amount of the surface hydroxyl group of aluminum nitride to be reacted with silane.

The optimum treatment amount of the silane compound is 0.2 to 3.8 wt % though it differs according to the particle diameter and specific surface area of the powder.

Out of the surface modifiers, a silazane compound such as hexamethyl disilazane has a low boiling point and reacts with the surface hydroxyl group in a ratio of 1:1. Therefore, an excessive amount of the silazane compound may be used. When an excessive amount of the silazane compound is added, it can be removed by hot evacuation. However, since the silazane compound generates ammonia, care must be taken that the amount of the silazane compound in contact with aluminum nitride which is weak to an alkaline state does not become excessive. When the amount of aluminum nitride is 100 parts by weight, the amount of the silazane compound is desirably not more than 0.8 part by weight based on 1 $m^2/g$ of the specific surface area of aluminum nitride.

<Contact Time with Silane Compound>

In the method (A-2) and the method (B), contact between the raw material aluminum nitride powder/solvent and the silane compound is preferably 5 minutes to 24 hours, more preferably 10 minutes to 10 hours at the time of dispersing the raw material aluminum nitride powder in the solvent.

[Composite Material for Heat Radiation]

When the aluminum nitride powder obtained by the method of the present invention is mixed with a resin, the resulting mixture can be advantageously used as a composite material for heat radiation.

The resin which can be used herein may be either one of a thermoplastic resin and a thermosetting resin. Examples of the above thermoplastic resin include polyethylene, polypropylene, ethylene-propylene copolymer, polymethyl pentene, polyvinyl chloride, polyvinylidene chloride, polyvinyl acetate, ethylene-vinyl acetate copolymer, polyvinyl alcohol, polyacetal, fluororesins (such as polyvinylidene fluoride and polytetrafluoroethylene), polyethylene terephthalate, polybutylene terephthalate, polyethylene-2,6-naphthalate, polystyrene, polyacrylonitrile, styrene-acrylonitrile copolymer, ABS resin, polyphenylene ether (PPE) resin, modified PPE resin, aliphatic polyamide, aromatic polyamide, polyimide, polyamide imide, polymethacrylic acid, polymethacrylic acid esters (such as methyl polymethacrylate), polyacrylic acid, polyacrylic acid esters (such as methyl polyacrylate), polycarbonate, polyphenylene sulfide, polysulfone, polyether sulfone, polyether nitrile, polyether ketone, polyether ether ketone, polyketone, liquid crystal polymer and ionomer; and examples of the above thermosetting resin include epoxy resin, acrylic resin, urethane resin, silicone resin, phenol resin, imide resin, thermosetting modified PPE and thermosetting PPE.

As for the use of the composite material for heat radiation which is produced by using the classified aluminum nitride powder obtained by the method of the present invention, the composite material may be used as the material of a heat radiating member which efficiently radiates heat from semiconductor parts to be mounted to home electric appliances, automobiles and notebook personal computers. Examples of the material include heat radiation grease, heat radiation gel, heat dissipation sheets, phase change sheets and adhesives. The above composite material may also be used in insulating layers for use in metal base substrates, printed circuit boards and flexible substrates, and semiconductor sealing agents, underfills, housings and heat dissipation fins.

EXAMPLES

The following examples are provided for the purpose of further illustrating the present invention but are in no way to be taken as limiting.

The methods of measuring physical properties in the present invention are described below.

[Particle Size Distribution]

The particle size distribution of a liquid prepared by dispersing the aluminum nitride powder in ethanol to a concentration of 1 mass % and carrying out about 200 W ultrasonic irradiation for 3 minutes is measured by using a laser diffraction scattering particle size distribution meter. In the volume frequency distribution of particle sizes, when volume frequencies are accumulated from smaller particle sizes, the value of particle size at which the cumulative value becomes 50% is taken as D50, the value of particle size at which the cumulative value becomes 90% is taken as D90, and the largest particle size counted as a particle is taken as the maximum count particle size.

[BET Specific Surface Area]

The BET specific surface area of an aluminum nitride powder was obtained by a BET method (nitrogen adsorption one-point method) using a specific surface area measurement device (FlowSorb 2-2300 of Shimadzu Corporation). 2 g of the aluminum nitride powder was used for the measurement and dried at 100° C. in a nitrogen gas flow for 1 hour in advance.

[Amount of Surface Hydroxyl Group]

The amount of a trimethylsilyl group produced on the surface of aluminum nitride when the aluminum nitride powder was dry treated with hexamethyl disilazane was estimated by carbon analysis and taken as the amount of the surface hydroxyl group.

[Carbon Analysis]

The content of carbon in the aluminum nitride powder was measured with a carbon analyzer (for example, EMIA-110 of Horiba, Ltd.). The powder was burnt in an oxygen air stream at 1,350° C. until a carbon dioxide gas was not generated any more to determine the content of carbon in each powder from the amount of the generated carbon dioxide. The content of carbon derived from the surface modified layer of the classified aluminum nitride powder was calculated from the following expression.

$$\text{content of carbon derived from surface modified layer (mass \%)} = (A-B) \times 100/C$$

A: content of carbon after surface modification (mass)
B: content of carbon before surface modification (mass)
C: mass of aluminum nitride powder after surface modification

[Elution Test]

2 g of the aluminum nitride powder and 100 g of ethanol were fed to a beaker having a capacity of 120 ml and stirred for 1 hour, the resulting suspension was centrifugally precipitated, and the supernatant was thrown away. The remaining powder was dried until the amount of moisture became not more than 0.5 mass %, and the obtained powder was measured by carbon analysis to calculate the content of carbon in the same manner as described above.

[Grind Gauge]

Figure 2:
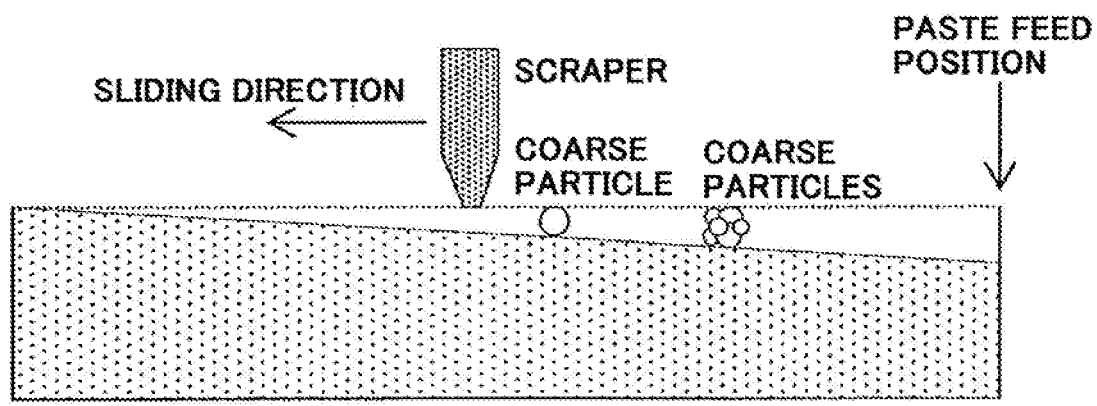
FIG. 2 This is a diagram for illustrating an operation method with a schematic side view of a grind gauge.
Figure 3:
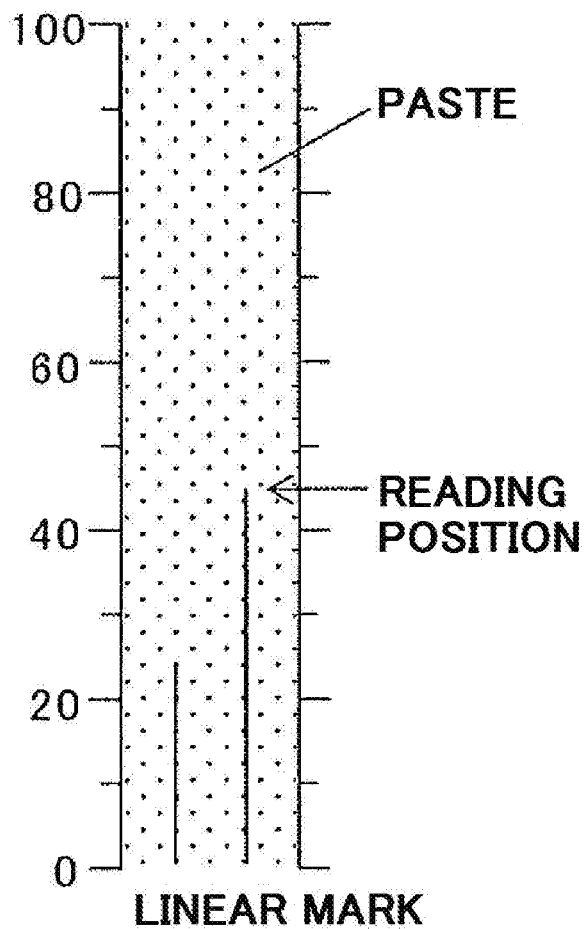
FIG. 3 This is a diagram showing a linear mark which appears on the grind gauge after the method of FIG. 2 is carried out. The unit of a figure "0 to 100" on the left side of the diagram is micrometer.
Figure 4:
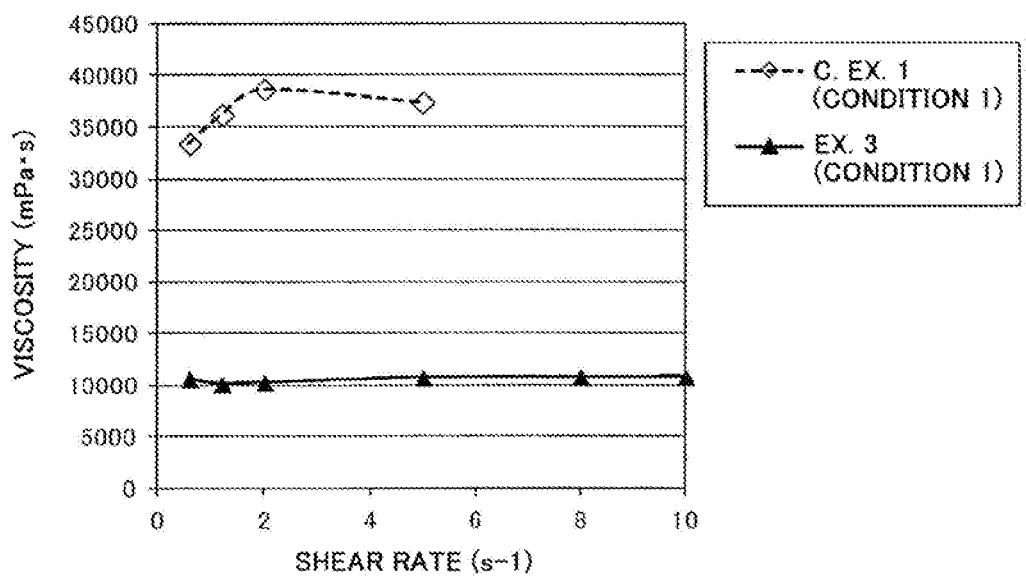
FIG. 4 This shows the viscosity corresponding to each shear rate of each of resin compositions obtained by mixing together aluminum nitride powders obtained in Example 3 and Comparative Example 1 and liquid epoxy resin.
Figure 5:
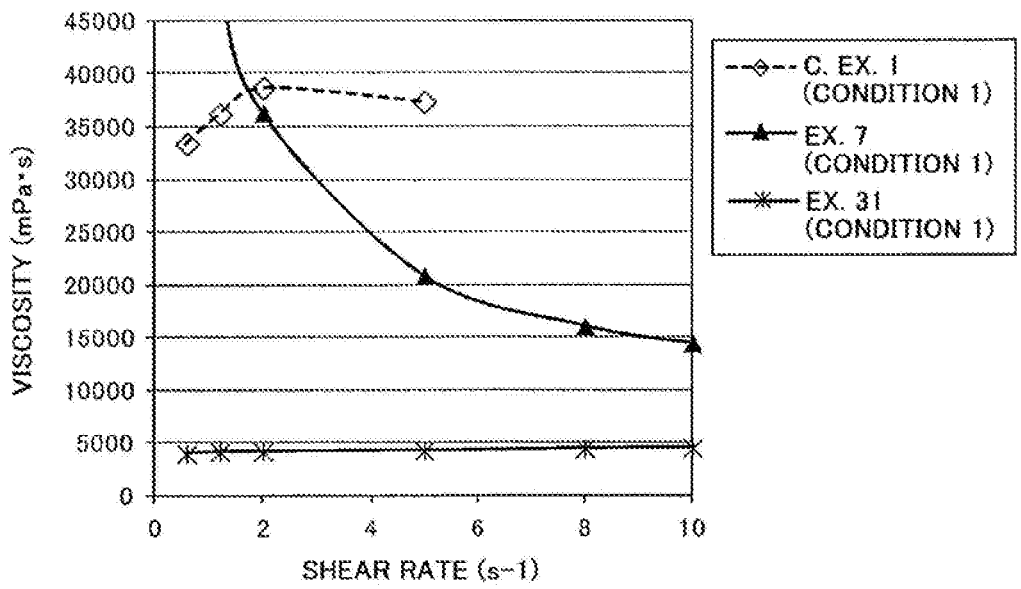
FIG. 5 This shows the viscosity corresponding to each shear rate of each of resin compositions obtained by mixing together aluminum nitride powders obtained in Example 7, Example 31 and Comparative Example 1 and liquid epoxy resin.
Figure 6:
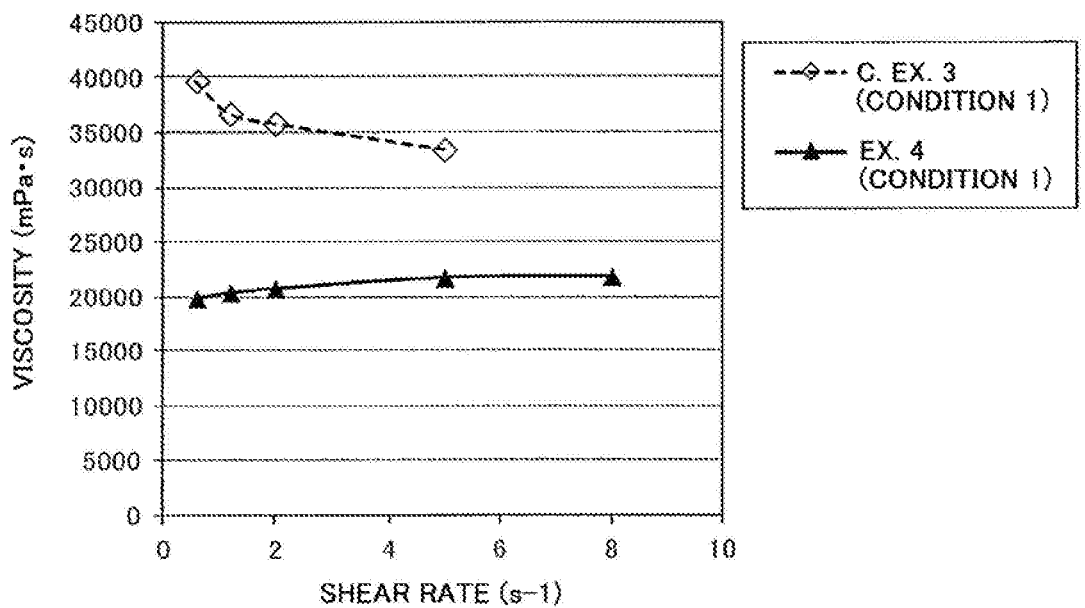
FIG. 6 This shows the viscosity corresponding to each shear rate of each of resin compositions obtained by mixing together aluminum nitride powders obtained in Example 4 and Comparative Example 3 and liquid epoxy resin.
Figure 7:
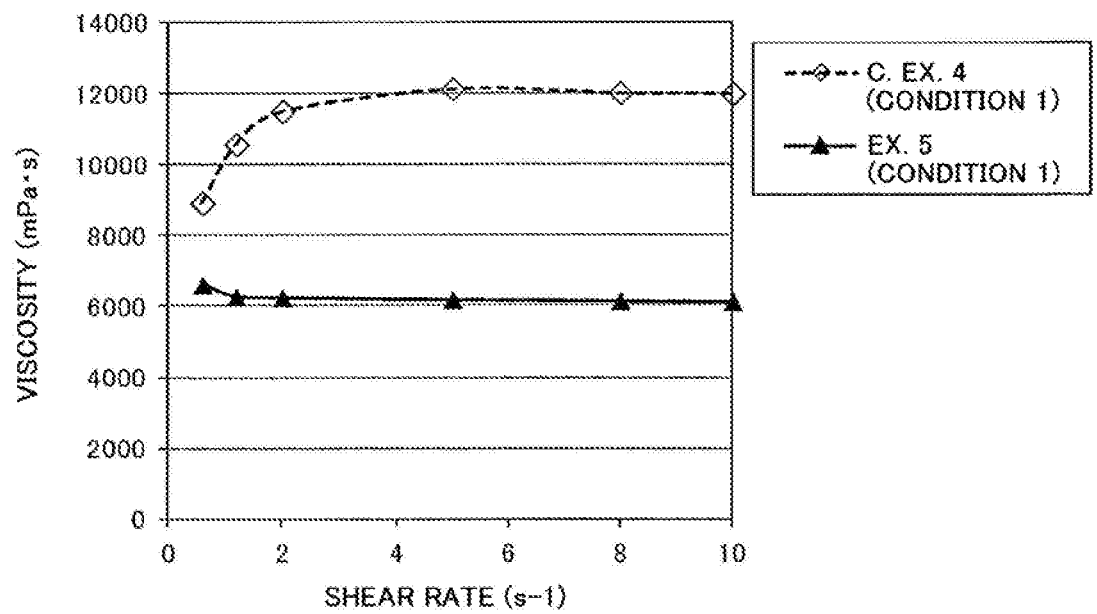
FIG. 7 This shows the viscosity corresponding to each shear rate of each of resin compositions obtained by mixing together aluminum nitride powders obtained in Example 5 and Comparative Example 4 and liquid epoxy resin.
Figure 8:
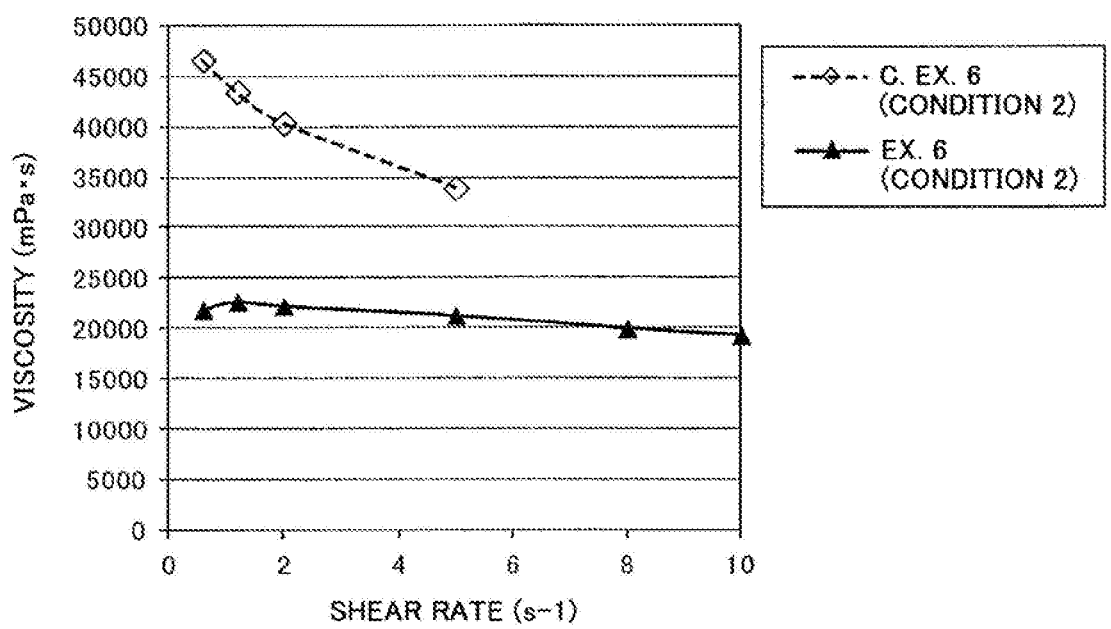
FIG. 8 This shows the viscosity corresponding to each shear rate of each of resin compositions obtained by mixing together aluminum nitride powders obtained in Example 6 and Comparative Example 6 and liquid epoxy resin.
Figure 9:
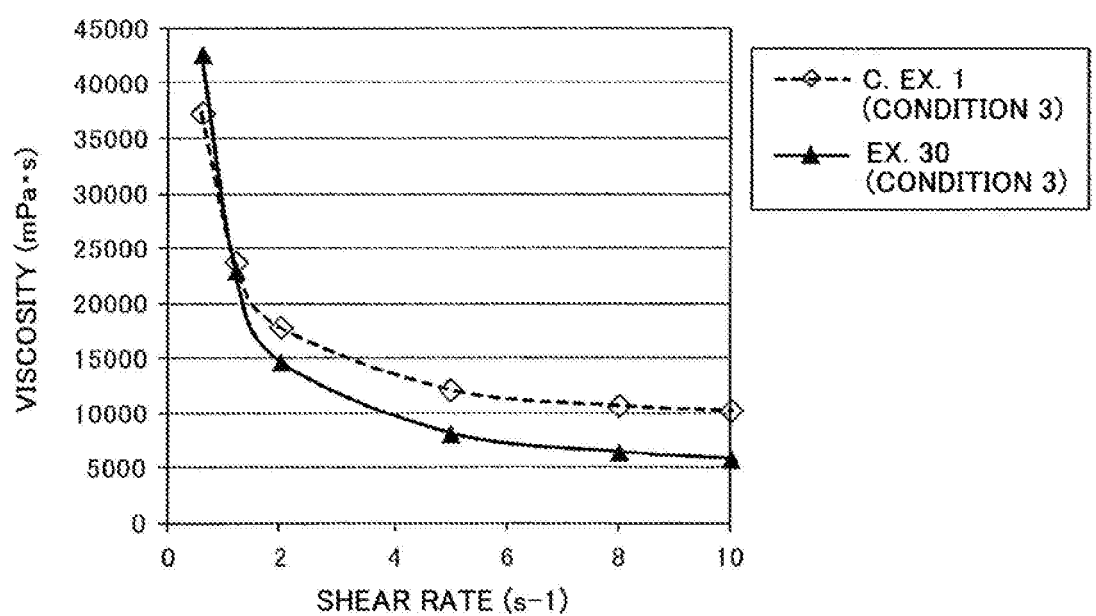
FIG. 9 This shows the viscosity corresponding to each shear rate of each of resin compositions obtained by mixing together aluminum nitride powders obtained in Example 30 and Comparative Example 1 and liquid epoxy resin.

To estimate the maximum particle size of a coarse particle contained in the aluminum nitride powder, a resin composition prepared by filling the aluminum nitride powder was evaluated with a grind gauge (particle size gauge) having a width of 90 mm, a length of 240 mm and a maximum depth of 50 μm in accordance with JIS-K5101. 3 g of the powder was mixed with 2 g of dimethyl silicone oil having a kinetic viscosity at 25° C. of 1,000 cSt (Element 14*PDMS 1000-J of Momentive Performance Materials Japan joint venture), and kneading and scraping operations were repeated 3 times with an automatic crusher to obtain paste containing the powder dispersed therein. The paste was placed on the particle size gauge and a scraper was applied to the paste perpendicularly to observe a linear mark when it was slid over a groove (see FIG. 2). This operation was repeated 3 times (n=3) to read a particle size at which the linear mark began to be seen (see FIG. 3).

[Evaluation of Viscosity]

To evaluate the characteristic properties of the aluminum nitride powder as a filler, the viscosity of a resin composition obtained by kneading the aluminum nitride powder with a liquid resin was measured. When the number of coarse particles such as agglomerated particles is reduced by classification, a rise in the flowability of the resin composition and the reduction of viscosity are expected. The RVDV-II+ CP rotational viscometer of Brookfield Co., Ltd. (using a cone plate having a diameter of 12 mm and an angle of 3°) was used as a viscosity measuring device.

Under the mixing condition 1, 0.552 g of the bisphenol F epoxy resin 807 of Mitsubishi Chemical Corporation was used as the liquid resin and 0.5 g of the aluminum nitride powder was used.

Under the mixing condition 2, 0.3 g of the bisphenol F epoxy resin 807 of Mitsubishi Chemical Corporation was used as the liquid resin and 0.44 g of the aluminum nitride powder was used.

Under the mixing condition 3, 0.466 g of dimethyl silicone oil (CY52-276A of Dow Corning Toray) having 1,000 mPa·s was used as the liquid resin and 0.65 g of the aluminum nitride powder was used. Kneading and scraping operations were carried out on pastes prepared by mixing them under the above mixing conditions 1 to 3 three times with an automatic crusher to prepare pastes containing the powder dispersed therein. The viscosity of each of the obtained pastes was measured at 30° C. The measurement of viscosity was carried out by changing the shear rate. FIG. 4 to FIG. 9 show viscosity plotted with respect to shear rate. There is a case in which no viscosity is plotted on a high shear rate side, and this is because viscosity could not be measured due to a high torque. As the typical values of the viscosity measurement results, values at a shear rate of 5 $s^{-1}$ are shown in Tables 1 to 3.

<Raw Material Aluminum Nitride Powder>
A1: H No. 1 grade powder manufactured by Tokuyama Corporation. D50=1.6 μm, D90=3.8 μm, maximum count particle size=9.3 μm, D90/D50=2.4, number of surface hydroxyl groups=1.4/$nm^2$, specific surface area=2.6 $m^2/g$
A2: obtained by pulverizing E-grade powder manufactured by Tokuyama Corporation with a jet mill. The powder was pulverized with the EMJ-OQ of EARTHTECHNICA CO., LTD. at an air pressure of 0.8 MPa and all collected with a bag filter. D50=1.1 μm, D90=1.6 μm, maximum count particle size=2.8 μm, D90/D50=1.5, number of surface hydroxyl groups=1.6/$nm^2$, specific surface area=3.8 $m^2/g$
A3: E-grade powder manufactured by Tokuyama Corporation. D50=1.3 μm, D90=2.8 μm, maximum count particle size=7.8 μm, D90/D50=2.2, number of surface hydroxyl groups=1.3/$nm^2$, specific surface area=3.3 $m^2/g$
A4: synthesized by the method described in JP-A 2014-201474. D50=1.7 μm, D90=2.8 μm, maximum count particle size=5.5 μm, D90/D50=1.6, number of surface hydroxyl groups=1.2/$nm^2$, specific surface area=2.0 $m^2/g$
A5: synthesized by the method described in Japan Patent No. 6038886. D50=2.7 μm, D90=4.3 μm, maximum count particle size=9.3 μm, D90/D50=1.6, number of surface hydroxyl groups=1.6/$nm^2$, specific surface area=1.7 $m^2/g$
A6: synthesized by the method described in Japan Patent No. 6038886. D50=6.0 μm, D90=12.2 μm, maximum count particle size=26.2 μm, D90/D50=2.0, number of surface hydroxyl groups=1.3/=$^2$, specific surface area=0.6 $m^2/g$ <Surface Modifier>
GPS: 3-glycidoxypropyl trimethoxysilane, (Tokyo Chemical Industry Co., Ltd., >97%)
GPMS: 3-glycidoxypropylmethyl dimethoxysilane (Shin-Etsu Chemical Co., Ltd., >95%)
ECHS: 2-(3,4-epoxycyclohexyl)ethyl trimethoxysilane (Tokyo Chemical Industry Co., Ltd., >97%)
MPS: 3-methacryloxypropyl trimethoxysilane (Tokyo Chemical Industry Co., Ltd., >98%)
AEPS: 2-aminoethyl-3-aminopropyl trimethoxysilane (Tokyo Chemical Industry Co., Ltd., >97%)
PMS: phenyl trimethoxysilane (Tokyo Chemical Industry Co., Ltd., >98%)
VMS: vinyl trimethoxysilane (Tokyo Chemical Industry Co., Ltd., >98%)
MMS: methyl trimethoxysilane (Tokyo Chemical Industry Co., Ltd., >98%)
DMDS: dimethyl dimethoxysilane (Tokyo Chemical Industry Co., Ltd., >98%)
PRMS: propyl trimethoxysilane (Tokyo Chemical Industry Co., Ltd., >98%)
HES: hexyl triethoxysilane (Tokyo Chemical Industry Co., Ltd., >98%)
OES: octyl triethoxysilane (Tokyo Chemical Industry Co., Ltd., >97%)
HMDS: hexamethyl disilazane (Tokyo Chemical Industry Co., Ltd., >96%)
DMS: decyl trimethoxysilane (Tokyo Chemical Industry Co., Ltd., >97%)
HDMS: hexadecyl trimethoxysilane (Tokyo Chemical Industry Co., Ltd., >85%)
ODMS: octadecyl trimethoxysilane (Tokyo Chemical Industry Co., Ltd., >85%)
PAPS: N-phenyl-3-aminopropyl trimethoxysilane (Shin-Etsu Chemical Co., Ltd., >95%)

<Solvent>
IPA: isopropyl alcohol (Wako Pure Chemical Industries, Ltd., guaranteed)

Comparative Examples 1 to 6

The evaluation of coarse particles with a grind gauge and the measurement of viscosity were made on raw material aluminum nitride powders A1 to A6, and the results are shown in Table 1.

TABLE 1

Example 1

| | AlN powder Type | Classification classified or not | Classification recovery rate (%) | evaluation with grind gauge Particle diameter producing a linear mark (n = 3) | viscosity at 5 s−1 (mPa · s) Condition 1 | Condition 2 | Condition 3 |
|---|---|---|---|---|---|---|---|
| C. Ex. 1 | A1 | not | — | 36, 38, 42 | 37386 | — | 12145 |
| C. Ex. 2 | A2 | not | — | 16, 12, 15 | — | — | — |
| C. Ex. 3 | A3 | not | — | 42, 45, 36 | 33417 | — | — |
| C. Ex. 4 | A4 | not | — | 23, 33, 35 | 12145 | — | — |
| C. Ex. 5 | A5 | not | — | 32, 40, 49 | — | — | — |
| C. EX. 6 | A6 | not | — | 41, 53, 60 | — | 33933 | — |

C. Ex.: Comparative Example 1,167 g of IPA was fed to a 2-L polybeaker, and 500 g of the raw material aluminum nitride powder A1 was further added and stirred with a stirring blade. The obtained suspension was let pass through a nylon filter having an opening diameter of 20 μm to remove coarse particles. Thereafter, IPA was removed from the suspension by evaporation with a rotary evaporator and then the suspension was vacuum dried at 80° C. to obtain a wet classified aluminum nitride powder. However, this dried powder contained a block object which could not be easily broken with hands. The evaluation results of coarse particles with a grind gauge are shown in Table 2.

Example 2

Although a wet classified aluminum nitride powder was obtained in the same manner as in Example 1 except that a nylon filter having an opening diameter of 15 lam was used, the dried powder contained a block object which could not be easily broken with hands. The evaluation results of coarse particles with a grind gauge are shown in Table 2.

Example 3

When wet classification was carried out in the same manner as in Example 1 except that a nylon filter having an opening diameter of 10 μm was used, the clogging of the filter occurred halfway and then the filter was exchanged with new one three times so that all the suspension could be let pass through the filters. As soon as the clogging of the filter occurred, the filter was exchanged and a cake precipitated on the filter was thrown away. IPA was removed from the suspension passing through the filter by evaporation with a rotary evaporator. Subsequently, the suspension was vacuum dried at 80° C. to obtain a wet classified aluminum nitride powder but the powder contained a block object which could not be easily broken with hands. The evaluation results of coarse particle with a grind gauge and the measurement result of viscosity are shown in Table 2.

Example 4

1,167 g of IPA was fed to a 2-L polybeaker and 500 g of the raw material aluminum nitride powder A3 was further added and stirred with a stirring blade. The obtained suspension was let pass through a nylon filter having an opening diameter of 10 μm to remove coarse particles. Thereafter, IPA was removed from the suspension by evaporation with a rotary evaporator and then the suspension was vacuum dried at 80° C. to obtain a wet classified aluminum nitride powder. However, this dried powder contained a block object which could not be easily broken with hands. The evaluation results of coarse particles with a grind gauge and the measurement result of viscosity are shown in Table 2.

Example 5

1,167 g of IPA was fed to a 2-L polybeaker and 500 g of the raw material aluminum nitride powder A4 was further added and stirred with a stirring blade. The obtained suspension was let pass through a nylon filter having an opening diameter of 10 μm to remove coarse particles. Thereafter, IPA was removed from the suspension by evaporation with a rotary evaporator and then the suspension was vacuum dried at 80° C. to obtain a wet classified aluminum nitride powder. However, this dried powder contained a block object which could not be easily broken with hands. The evaluation results of coarse particles with a grind gauge and the measurement result of viscosity are shown in Table 2.

Example 6

1,167 g of IPA was fed to a 2-L polybeaker and 500 g of the raw material aluminum nitride powder A6 was further added and stirred with a stirring blade. The obtained suspension was let pass through a nylon filter having an opening diameter of 30 μm to remove coarse particles. Thereafter, IPA was removed from the suspension by evaporation with a rotary evaporator and then the suspension was vacuum dried at 80° C. to obtain a wet classified aluminum nitride powder. However, this dried powder contained a block object which could not be easily broken with hands. The evaluation results of coarse particles with a grind gauge and the measurement result of viscosity are shown in Table 2.

Example 7

After 2.36 g of GPS as a surface modifier and 1,167 g of IPA were fed to a 2-L polybeaker and it was confirmed that the surface modifier was dissolved, 500 g of the raw material aluminum nitride powder A1 was added to the above IPA solution and stirred with a stirring blade. The obtained suspension was let pass through a nylon filter having an opening diameter of 10 μm to remove coarse particles. Thereafter, IPA was removed from the suspension by evaporation with a rotary evaporator and then the suspension was vacuum dried at 80° C. to obtain a wet classified and surface modified aluminum nitride powder. This dried powder could be easily broken with hands. The content of carbon derived from the surface modifier before and after washing, the evaluation results of coarse particles with a grind gauge and the measurement result of viscosity are shown in Table 2.

Example 8

An aluminum nitride powder which was wet classified and surface modified was obtained in the same manner as in Example 7 except that 0.12 g of GPS as a surface modifier was used. The dried powder was easily broken with hands. The content of carbon derived from the surface modifier before and after washing and the evaluation results of coarse particles with a grind gauge are shown in Table 2.

Example 9

An aluminum nitride powder which was wet classified and surface modified was obtained in the same manner as in Example 7 except that 0.59 g of GPS as a surface modifier was used. The dried powder was easily broken with hands. The content of carbon derived from the surface modifier before and after washing and the evaluation results of coarse particles with a grind gauge are shown in Table 2.

Example 10

An aluminum nitride powder which was wet classified and surface modified was obtained in the same manner as in Example 7 except that 1.18 g of GPS as a surface modifier was used. The dried powder was easily broken with hands. The content of carbon derived from the surface modifier before and after washing and the evaluation results of coarse particles with a grind gauge are shown in Table 2.

Example 11

An aluminum nitride powder which was wet classified and surface modified was obtained in the same manner as in Example 7 except that 3.55 g of GPS as a surface modifier was used. The dried powder was easily broken with hands. The content of carbon derived from the surface modifier before and after washing and the evaluation results of coarse particles with a grind gauge are shown in Table 2.

Example 12

An aluminum nitride powder which was wet classified and surface modified was obtained in the same manner as in Example 7 except that 5.32 g of GPS as a surface modifier was used. The dried powder was easily broken with hands. The content of carbon derived from the surface modifier before and after washing and the evaluation results of coarse particles with a grind gauge are shown in Table 2.

Example 13

An aluminum nitride powder which was wet classified and surface modified was obtained in the same manner as in Example 7 except that a nylon filter having an opening diameter of 7 μm was used. The dried powder was easily broken with hands. The content of carbon derived from the surface modifier before and after washing and the evaluation results of coarse particles with a grind gauge are shown in Table 2.

Example 14

An aluminum nitride powder which was wet classified and surface modified was obtained in the same manner as in Example 7 except that the raw material aluminum nitride powder A2 was used. The dried powder was easily broken with hands. The content of carbon derived from the surface modifier before and after washing and the evaluation results of coarse particles with a grind gauge are shown in Table 2.

Example 15

An aluminum nitride powder which was wet classified and surface modified was obtained in the same manner as in Example 7 except that the raw material aluminum nitride powder A3 was used. The dried powder was easily broken with hands. The content of carbon derived from the surface modifier before and after washing and the evaluation results of coarse particles with a grind gauge are shown in Table 2.

Example 16

An aluminum nitride powder which was wet classified and surface modified was obtained in the same manner as in Example 7 except that the raw material aluminum nitride powder A4 was used. The dried powder was easily broken with hands. The content of carbon derived from the surface modifier before and after washing and the evaluation results of coarse particles with a grind gauge are shown in Table 2.

Example 17

An aluminum nitride powder which was wet classified and surface modified was obtained in the same manner as in Example 7 except that the raw material aluminum nitride powder A4 was used and a nylon filter having an opening diameter of 7 μm was used. The dried powder was easily broken with hands. The content of carbon derived from the surface modifier before and after washing and the evaluation results of coarse particles with a grind gauge are shown in Table 2.

Example 18

An aluminum nitride powder which was wet classified and surface modified was obtained in the same manner as in Example 7 except that the raw material aluminum nitride powder A5 was used and a nylon filter having an opening diameter of 20 μm was used. The dried powder was easily broken with hands. The content of carbon derived from the surface modifier before and after washing and the evaluation results of coarse particles with a grind gauge are shown in Table 2.

Example 19

An aluminum nitride powder which was wet classified and surface modified was obtained in the same manner as in Example 7 except that the raw material aluminum nitride powder A6 was used and a nylon filter having an opening diameter of 30 μm was used. The dried powder was easily broken with hands. The content of carbon derived from the surface modifier before and after washing and the evaluation results of coarse particles with a grind gauge are shown in Table 2.

TABLE 2

| | | Classification | | | Surface modifier | | Paticle size distribution after classification | | |
|---|---|---|---|---|---|---|---|---|---|
| | | filter | | Classification | | | | | |
| | AlN powder | classified or not | Opening diameter | recovery rate (%) | Type | amount (μmol/g) | D50 (μm) | D90 (μm) | D90/D50 (—) |
| Ex. 1 | A1 | classified | 20 | 70 | — | — | 1.6 | 3.8 | 2.4 |
| Ex. 2 | A1 | classified | 15 | 62 | — | — | 1.6 | 3.7 | 2.3 |
| Ex. 3 | A1 | classified | 10 | 35 | — | — | 1.5 | 3.6 | 2.4 |
| Ex. 4 | A3 | classified | 10 | 25 | — | — | 1.3 | 2.8 | 2.2 |
| Ex. 5 | A4 | classified | 10 | 65 | — | — | 1.7 | 2.7 | 1.6 |
| Ex. 6 | A6 | classified | 30 | 72 | — | — | 5.8 | 11.3 | 1.9 |
| Ex. 7 | A1 | classified | 10 | 82 | GPS | 20 | 1.5 | 3.7 | 2.5 |
| Ex. 8 | A1 | classified | 10 | 75 | GPS | 1 | 1.6 | 3.8 | 2.4 |
| Ex. 9 | A1 | classified | 10 | 77 | GPS | 5 | 1.6 | 3.7 | 2.3 |
| Ex. 10 | A1 | classified | 10 | 80 | GPS | 10 | 1.5 | 3.7 | 2.5 |
| Ex. 11 | A1 | classified | 10 | 83 | GPS | 30 | 1.7 | 3.9 | 2.3 |
| Ex. 12 | A1 | classified | 10 | 84 | GPS | 45 | 1.8 | 3.9 | 2.2 |
| Ex. 13 | A1 | classified | 7 | 70 | GPS | 20 | 1.6 | 3.7 | 2.3 |
| Ex. 14 | A2 | classified | 10 | 90 | GPS | 20 | 1.1 | 1.5 | 1.4 |
| Ex. 15 | A3 | classified | 10 | 80 | GPS | 30 | 1.3 | 2.8 | 2.2 |

TABLE 2-continued

| | | | | | | | | | |
|---|---|---|---|---|---|---|---|---|---|
| Ex. 16 | A4 | classified | 10 | 90 | GPS | 20 | 1.7 | 2.7 | 1.6 |
| Ex. 17 | A4 | classified | 7 | 88 | GPS | 20 | 1.7 | 2.6 | 1.5 |
| Ex. 18 | A5 | classified | 20 | 78 | GPS | 12 | 2.5 | 4.1 | 1.6 |
| Ex. 19 | A6 | classified | 30 | 75 | GPS | 7 | 5.8 | 10.9 | 1.9 |

| | BET specific surface area after classification (m2/g) | content of carbon derived from surface modifier before washing (wt %) | content of carbon derived from surface modifier after wasing (wt %) | Evaluation of grind gauge Particle size porducing a streak (n = 3) | Viscosiy at 5 s−1 (mPa · s) Condition 1 | Viscosiy at 5 s−1 (mPa · s) Condition 2 | Viscosiy at 5 s−1 (mPa · s) Condition 3 |
|---|---|---|---|---|---|---|---|
| Ex. 1 | 2.6 | — | — | 8, 10, 13 | — | — | — |
| Ex. 2 | 2.6 | — | — | 6, 9, 11 | — | — | — |
| Ex. 3 | 2.6 | — | — | 5, 7, 10 | 10679 | — | — |
| Ex. 4 | 3.1 | — | — | 8, 9, 10 | 21670 | — | — |
| Ex. 5 | 1.9 | — | — | 7, 9, 10 | 6191 | — | — |
| Ex. 6 | 0.6 | — | — | 20, 26, 30 | — | 21233 | — |
| Ex. 7 | 2.3 | 0.144 | 0.137 | all <3 | 20836 | — | — |
| Ex. 8 | 2.6 | 0.007 | 0.006 | all <3 | — | — | — |
| Ex. 9 | 2.5 | 0.036 | 0.031 | all <3 | — | — | — |
| Ex. 10 | 2.4 | 0.072 | 0.058 | all <3 | — | — | — |
| Ex. 11 | 2.2 | 0.216 | 0.162 | all <3 | — | — | — |
| Ex. 12 | 2.1 | 0.324 | 0.243 | all <3 | — | — | — |
| Ex. 13 | 2.5 | 0.144 | 0.115 | all <3 | — | — | — |
| Ex. 14 | 3.5 | 0.144 | 0.115 | all <3 | — | — | — |
| Ex. 15 | 3.1 | 0.216 | 0.168 | all <3 | — | — | — |
| Ex. 16 | 1.9 | 0.144 | 0.112 | all <3 | — | — | — |
| Ex. 17 | 1.9 | 0.146 | 0.118 | all <3 | — | — | — |
| Ex. 18 | 0.8 | 0.086 | 0.068 | 10, 13, 17 | — | — | — |
| Ex. 19 | 0.6 | 0.050 | 0.040 | 15, 22, 30 | — | — | — |

Ex.: Example

Example 20

An aluminum nitride powder which was wet classified and surface modified was obtained in the same manner as in Example 7 except that 2.20 g of GPMS was used as the surface modifier. The dried powder was easily broken with hands. The content of carbon derived from the surface modifier before and after washing and the evaluation results of coarse particles with a grind gauge are shown in Table 3.

Example 21

An aluminum nitride powder which was wet classified and surface modified was obtained in the same manner as in Example 7 except that 2.46 g of ECHS was used as the surface modifier. The dried powder was easily broken with hands. The content of carbon derived from the surface modifier before and after washing and the evaluation results of coarse particles with a grind gauge are shown in Table 3.

Example 22

An aluminum nitride powder which was wet classified and surface modified was obtained in the same manner as in Example 7 except that 2.48 g of MPS was used as the surface modifier. The dried powder was easily broken with hands. The content of carbon derived from the surface modifier before and after washing and the evaluation results of coarse particles with a grind gauge are shown in Table 3.

Example 23

An aluminum nitride powder which was wet classified and surface modified was obtained in the same manner as in Example 7 except that 2.22 g of AEPS was used as the surface modifier. The dried powder was easily broken with hands. The content of carbon derived from the surface modifier before and after washing and the evaluation results of coarse particles with a grind gauge are shown in Table 3.

Example 24

An aluminum nitride powder which was wet classified and surface modified was obtained in the same manner as in Example 7 except that 1.98 g of PMS was used as the surface modifier. The dried powder was easily broken with hands. The content of carbon derived from the surface modifier before and after washing and the evaluation results of coarse particles with a grind gauge are shown in Table 3.

Example 25

An aluminum nitride powder which was wet classified and surface modified was obtained in the same manner as in Example 7 except that 1.48 g of VMS was used as the surface modifier. The dried powder was easily broken with hands. The content of carbon derived from the surface modifier before and after washing and the evaluation results of coarse particles with a grind gauge are shown in Table 3.

Example 26

An aluminum nitride powder which was wet classified and surface modified was obtained in the same manner as in Example 7 except that 1.36 g of MMS was used as the surface modifier. The dried powder was easily broken with hands. The content of carbon derived from the surface modifier before and after washing and the evaluation results of coarse particles with a grind gauge are shown in Table 3.

Example 27

An aluminum nitride powder which was wet classified and surface modified was obtained in the same manner as in Example 7 except that 1.20 g of DMDS was used as the surface modifier. The dried powder was easily broken with hands. The content of carbon derived from the surface modifier before and after washing and the evaluation results of coarse particles with a grind gauge are shown in Table 3.

Example 28

An aluminum nitride powder which was wet classified and surface modified was obtained in the same manner as in Example 7 except that 1.64 g of PRMS was used as the surface modifier. The dried powder was easily broken with hands. The content of carbon derived from the surface modifier before and after washing and the evaluation results of coarse particles with a grind gauge are shown in Table 3.

Example 29

An aluminum nitride powder which was wet classified and surface modified was obtained in the same manner as in Example 7 except that 2.48 g of HES was used as the surface modifier. The dried powder was easily broken with hands. The content of carbon derived from the surface modifier before and after washing and the evaluation results of coarse particles with a grind gauge are shown in Table 3.

Example 30

An aluminum nitride powder which was wet classified and surface modified was obtained in the same manner as in Example 7 except that 2.77 g of OES was used as the surface modifier. The dried powder was easily broken with hands. The content of carbon derived from the surface modifier before and after washing, the evaluation results of coarse particles with a grind gauge and the measurement result of viscosity are shown in Table 3.

Example 31

An aluminum nitride powder which was wet classified and surface modified was obtained in the same manner as in Example 7 except that 2.55 g of PAPS was used as the surface modifier. The dried powder was easily broken with hands. The content of carbon derived from the surface modifier before and after washing, the evaluation results of coarse particles with a grind gauge and the measurement result of viscosity are shown in Table 3.

Example 32

After 2.36 g of GPS as a surface modifier and 1,167 g of IPA were fed to a 2-L polybeaker and it was confirmed that the surface modifier was dissolved, 500 g of the raw material aluminum nitride powder A1 was added to the above IPA solution and stirred with a stirring blade. Thereafter, IPA was removed from the suspension by evaporation with a rotary evaporator and then the suspension was vacuum dried at 80° C. The obtained surface modified powder was fed to a 2-L polybeaker and 1,167 g of IPA was further added to prepare a suspension. The suspension stirred with the stirring blade was let pass through a nylon filter having an opening diameter of 7 μm to remove coarse particles. Thereafter, IPA was removed from the suspension by evaporation with the rotary evaporator and then the suspension was vacuum dried at 80° C. to obtain a wet classified and surface modified aluminum nitride powder. The dried powder was easily broken with hands. The content of carbon derived from the surface modifier before and after washing and the evaluation results of coarse particles with a grind gauge are shown in Table 3.

Example 33

An aluminum nitride powder which was wet classified and surface modified was obtained in the same manner as in Example 32 except that 2.77 g of OES was used as the surface modifier. The dried powder was easily broken with hands. The content of carbon derived from the surface modifier before and after washing and the evaluation results of coarse particles with a grind gauge are shown in Table 3.

Example 34

500 g of the raw material aluminum nitride powder A1 was fed to a 2-L stainless closed container and evacuation and nitrogen introduction were repeated 3 times to remove oxygen contained in the powder. Thereafter, 7.50 g of HMDS was injected into the closed container from a treating agent introduction pipe. After the container was heated at 150° C. for 3 hours while the inside of the container was stirred with a stirring blade, evacuation was further carried out at 150° C. for 3 hours. The obtained surface modified powder was fed to a 2-L polybeaker and 1,167 g of IPA was further added to prepare a suspension. The suspension stirred with a stirring blade was let pass through a nylon filter having an opening diameter of 7 μm to remove coarse particles. Thereafter, IPA was removed from the suspension by evaporation with a rotary evaporator and the suspension was vacuum dried at 80° C. to obtain a wet classified and surface modified aluminum nitride powder. The dried powder was easily broken with hands. The content of carbon derived from the surface modifier before and after washing and the evaluation results of coarse particles with a grind gauge are shown in Table 3.

TABLE 3

| | | Classification | | | Surface modifier | | Particle size distribution | | |
|---|---|---|---|---|---|---|---|---|---|
| | AlN powder | Classified or not | Filter Opening diameter | Classification recovery rate (%) | Type | amount (μmol/g) | D50 (μm) | D90 (μm) | D90/D50 (—) |
| Ex. 20 | A1 | Classified | 10 | 82 | GPMS | 20 | 1.6 | 3.7 | 2.3 |
| Ex. 21 | A1 | Classified | 10 | 78 | ECHS | 20 | 1.7 | 3.8 | 2.2 |
| Ex.: 22 | A1 | Classified | 10 | 83 | MPS | 20 | 1.5 | 3.7 | 2.5 |
| Ex. 23 | A1 | Classified | 10 | 75 | AEPS | 20 | 1.7 | 3.8 | 2.2 |
| Ex. 24 | A1 | Classified | 10 | 81 | PMS | 20 | 1.6 | 3.8 | 2.4 |
| Ex. 25 | A1 | Classified | 10 | 82 | VMS | 20 | 1.6 | 3.7 | 2.3 |
| Ex. 26 | A1 | Classified | 10 | 81 | MMS | 20 | 1.6 | 3.8 | 2.4 |

TABLE 3-continued

| | | | | | | | | | |
|---|---|---|---|---|---|---|---|---|---|
| Ex. 27 | A1 | Classified | 10 | 81 | DMDS | 20 | 1.6 | 3.7 | 2.3 |
| Ex. 28 | A1 | Classified | 10 | 82 | PRMS | 20 | 1.6 | 3.8 | 2.4 |
| Ex. 29 | A1 | Classified | 10 | 79 | HES | 20 | 1.5 | 3.7 | 2.5 |
| Ex. 30 | A1 | Classified | 10 | 80 | OES | 20 | 1.5 | 3.6 | 2.4 |
| Ex. 31 | A1 | Classified | 10 | 85 | PAPS | 10 | 1.5 | 3.6 | 2.4 |
| Ex. 32 | A1 | Classified | 10 | — | GPS | 20 | 1.7 | 3.9 | 2.3 |
| Ex. 33 | A1 | Classified | 10 | — | OES | 20 | 1.8 | 4 | 2.2 |
| Ex. 34 | A1 | Classified | 10 | — | HMDS | 40 | 1.6 | 3.7 | 2.3 |

| | BET specific surface area after classification ($m^2/g$) | Content of carbon derived from surface modifier | | Evaluation with grind gauge particle size producing a streak (n = 3) | Viscosity at 5 s−1 (mPa · s) | | |
|---|---|---|---|---|---|---|---|
| | | before washing (wt %) | after washing (wt %) | | Condition 1 | Condition 2 | Condition 3 |
| Ex. 20 | 2.3 | 0.168 | 0.141 | all <3 | — | — | — |
| Ex. 21 | 2.1 | 0.192 | 0.150 | all <3 | — | — | — |
| Ex.: 22 | 2.3 | 0.168 | 0.133 | all <3 | — | — | — |
| Ex. 23 | 2.2 | 0.120 | 0.098 | <3, 5, 7 | — | — | — |
| Ex. 24 | 2.3 | 0.144 | 0.118 | all <3 | — | — | — |
| Ex. 25 | 2.4 | 0.048 | 0.039 | all <3 | — | — | — |
| Ex. 26 | 2.4 | 0.024 | 0.018 | all <3 | — | — | — |
| Ex. 27 | 2.3 | 0.048 | 0.037 | 全て<3 | — | — | — |
| Ex. 28 | 2.4 | 0.072 | 0.059 | all <3 | — | — | — |
| Ex. 29 | 2.4 | 0.144 | 0.112 | <3, 5, 8 | — | — | — |
| Ex. 30 | 2.3 | 0.192 | 0.152 | <3, 9, 10 | — | — | 8136 |
| Ex. 31 | 2.3 | 0.216 | 0.168 | all <3 | 4247 | — | — |
| Ex. 32 | 2.1 | 0.144 | 0.115 | all <3 | — | — | — |
| Ex. 33 | 1.9 | 0.192 | 0.154 | all <3 | — | — | — |
| Ex. 34 | 2.4 | 0.024 | 0.023 | all <3 | — | — | — |

Ex.: Example

Comparative Example 8

After 2.36 g of GPS as a surface modifier and 1,167 g of IPA were fed to a 2-L polybeaker and it was confirmed that the surface modifier was dissolved, 500 g of the raw material aluminum nitride powder A1 was added to the above IPA solution and stirred with a stirring blade. IPA was removed from the suspension by evaporation with a rotary evaporator and then the suspension was vacuum dried at 80° C. to obtain a surface modified aluminum nitride powder. The dried powder was easily broken with hands. The content of carbon derived from the surface modifier before and after washing and the evaluation results of coarse particles with a grind gauge are shown in Table 4.

Comparative Example 9

A surface modified aluminum nitride powder was obtained in the same manner as in Comparative Example 8 except that 2.77 g of OES was used as the surface modifier. The dried powder was easily broken with hands. The content of carbon derived from the surface modifier before and after washing and the evaluation results of coarse particles with a grind gauge are shown in Table 4.

Comparative Example 10

An aluminum nitride powder which was wet classified and surface modified was obtained in the same manner as in Example 4 except that 2.63 g of DMS was used as the surface modifier. The dried powder was easily broken with hands. The content of carbon derived from the surface modifier before and after washing and the evaluation results of coarse particles with a grind gauge are shown in Table 4.

Comparative Example 11

An aluminum nitride powder which was wet classified and surface modified was obtained in the same manner as in Example 4 except that 3.47 g of HDMS was used as the surface modifier. The dried powder was easily broken with hands. The content of carbon derived from the surface modifier before and after washing and the evaluation results of coarse particles with a grind gauge are shown in Table 4.

Comparative Example 12

An aluminum nitride powder which was wet classified and surface modified was obtained in the same manner as in Example 4 except that 3.75 g of ODMS was used as the surface modifier. The dried powder was easily broken with hands. The content of carbon derived from the surface modifier before and after washing and the evaluation results of coarse particles with a grind gauge are shown in Table 4.

TABLE 4

| | | Classification | | | Surface modifier | | Particle size distribution after classification | | |
|---|---|---|---|---|---|---|---|---|---|
| | AlN powder | classified or not | Filter opening diameter | Classification recovery rate (%) | Type | Amount (µmol/g) | D50 (µm) | D90 (µm) | D90/D50 (—) |
| C. Ex. 8 | A1 | not | — | — | GPS | 20 | — | — | — |
| C. Ex. 9 | A1 | not | — | — | OES | 20 | — | — | — |

TABLE 4-continued

| | | | | | | | | | |
|---|---|---|---|---|---|---|---|---|---|
| C. Ex. 10 | A1 | classified | 10 | 83 | DMS | 20 | 1.5 | 3.8 | 2.5 |
| C. Ex. 11 | A1 | classified | 10 | 79 | HDMS | 20 | 1.7 | 4.0 | 2.4 |
| C. Ex. 12 | A1 | classified | 10 | 74 | ODMS | 20 | 1.8 | 4.2 | 2.3 |

| | BET specific surface area after classification (m2/g) | Content of carbon derived from surface modifier | | Evaluation with grind gauge Particle size producing a linear mark (n = 3) |
|---|---|---|---|---|
| | | before washing (wt %) | after washing (wt %) | |
| C. Ex. 8 | — | 0.144 | 0.115 | 25, 32, 40 |
| C. Ex. 9 | — | 0.192 | 0.152 | 17, 39, 42 |
| C. Ex. 10 | 1.8 | 0.240 | 0.168 | 7, 20, 31 |
| C. Ex. 11 | 1.6 | 0.384 | 0.250 | 10, 22, 35 |
| C. Ex. 12 | 1.5 | 0.432 | 0.268 | 12, 23, 38 |

C. Ex.: Comparative Example

The invention claimed is:

1. An aluminum nitride powder having a cumulative volume 50% particle diameter D50 of 0.5 to 7.0 μm in particle size distribution measured with a laser diffraction scattering particle size distribution meter, a ratio of cumulative volume 90% particle diameter D90 to D50 (=D90/D50) of 1.3 to 3.5 and a BET specific surface area of 0.4 to 6.0 m²/g, wherein
when paste obtained by mixing together 150 parts by mass of the aluminum nitride powder and 100 parts by mass of silicone oil having a kinetic viscosity at 25° C. of 1.000 cSt is measured with a grind gauge, the upper limit particle diameter at which a linear mark is produced is not more than 5 times as large as D90.

2. The aluminum nitride powder according to claim 1, wherein an oxide film is formed on the surface and the number of hydroxyl groups on the surface of the oxide film is smaller than 2/nm².

3. The aluminum nitride powder according to claim 2 which is further treated with a surface modifier.

4. The aluminum nitride powder according to claim 1 which is further treated with a surface modifier.

5. The aluminum nitride powder according to claim 4, wherein the surface modifier is a silane compound or silazane compound, and the number of carbons of an organic functional group having the largest number of carbons excluding the hydrolyzable group of the silane compound or an organic functional group having the largest number of carbons of the silazane compound is not larger than 9.

6. The aluminum nitride powder according to claim 4 which has a carbon content of 0.001 to 0.35 mass %.

7. The aluminum nitride powder according to claim 6, wherein the surface modifier is a silane compound or silazane compound, and the number of carbons of an organic functional group having the largest number of carbons excluding the hydrolyzable group of the silane compound or an organic functional group having the largest number of carbons of the silazane compound is not larger than 9.

8. A resin composition comprising the aluminum nitride powder of claim 1 and a resin.

9. A resin composition comprising the aluminum nitride powder of claim 2 and a resin.

10. A resin composition comprising the aluminum nitride powder of claim 4 and a resin.

11. A resin composition comprising the aluminum nitride powder of claim 6 and a resin.

12. A resin composition comprising the aluminum nitride powder of claim 5 and a resin.

* * * * *